United States Patent
Sugio et al.

(10) Patent No.: US 12,413,781 B2
(45) Date of Patent: Sep. 9, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Takahiro Nishi, Nara (JP); Pongsak Lasang, Singapore (SG); Zheng Wu, Singapore (SG); Keng Liang Loi, Singapore (SG); Chung Dean Han, Johor Bahru (MY)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 168 days.

(21) Appl. No.: 18/379,418

(22) Filed: Oct. 12, 2023

(65) Prior Publication Data

US 2024/0040150 A1 Feb. 1, 2024

Related U.S. Application Data

(63) Continuation of application No. PCT/JP2022/017695, filed on Apr. 13, 2022.
(Continued)

(51) Int. Cl.
*H04N 19/597* (2014.01)
*H04N 19/159* (2014.01)
*H04N 19/91* (2014.01)

(52) U.S. Cl.
CPC ......... *H04N 19/597* (2014.11); *H04N 19/159* (2014.11); *H04N 19/91* (2014.11)

(58) Field of Classification Search
CPC .... H04N 19/176; H04N 19/70; H04N 19/105; H04N 19/159; H04N 19/593; H04N 19/52; H04N 19/597; H04N 19/51; H04N 19/46
See application file for complete search history.

(56) References Cited

U.S. PATENT DOCUMENTS

2014/0375638 A1 12/2014 Tomaru et al.
2015/0181237 A1 6/2015 Tsukuba et al.
(Continued)

FOREIGN PATENT DOCUMENTS

WO 2013/190990 12/2013
WO 2014/020663 2/2014
(Continued)

OTHER PUBLICATIONS

International Search Report (ISR) issued on Jul. 5, 2022 in International (PCT) Application No. PCT/JP2022/017695.

*Primary Examiner* — Farhan Mahmud
(74) *Attorney, Agent, or Firm* — Wenderoth, Lind & Ponack, L.L.P.

(57) ABSTRACT

A three-dimensional data encoding method includes: calculating a predicted value of a position of a three-dimensional point according to one of inter prediction and intra prediction; calculating a residual between the predicted value and the position; arithmetic-encoding the residual using a first context when the predicted value is calculated according to the inter prediction; and arithmetic-encoding the residual using a second context different from the first context when the predicted value is calculated according to the intra
(Continued)

prediction. The residual is expressed by third residual information indicating a bit count of the residual.

12 Claims, 10 Drawing Sheets

Related U.S. Application Data

(60) Provisional application No. 63/177,619, filed on Apr. 21, 2021.

(56) References Cited

U.S. PATENT DOCUMENTS

| | | |
|---|---|---|
| 2020/0260070 A1 | 8/2020 | Yoo et al. |
| 2021/0312670 A1* | 10/2021 | Mammou ................. G06T 9/40 |
| 2021/0314612 A1 | 10/2021 | Sugio et al. |
| 2022/0224941 A1 | 7/2022 | Sugio et al. |

FOREIGN PATENT DOCUMENTS

| | | |
|---|---|---|
| WO | 2020/138352 | 7/2020 |
| WO | 2021/070952 | 4/2021 |

\* cited by examiner

FIG. 7

| geometry_parameter_set( ) { | Descriptor |
|---|---|
| ... | |
| gps_alt_coordinates_flag | u(1) |
| if( gps_alt_coordinates_flag ){ | |
| gps_coordinate_trans_enabled_flag | u(1) |
| } | |
| ... | |
| } | |

FIG. 8

| geometry_prediction_tree_node( ) { | Descriptor |
|---|---|
| ... | |
| pred_mode | ae(v) |
| ... | |
| if( gps_inter_prediction_enabeled_flag ) | |
| intra_pred_flag | ae(v) |
| if( !intra_pred_flag ){ | |
| inter_pred_mode | ae(v) |
| for( i = 0; i < NumRefPoints; i++ ) | |
| inter_ref_point_idx[ i ] | ae(v) |
| } | |
| for( i = 0; i < 3; i++ ) | |
| 1st_residual_value[ i ] | ae(v) |
| if( gps_coordinate_trans_enabled_flag ) | |
| for( i = 0; i < 3; i++ ) | |
| 2nd_residual_value[ i ] | ae(v) |
| ... | |
| } | |

FIG. 9

```
geometry_data {
...
 for (i=0; i<NumOfPoint; i++) {
  child_count
  intra_pred_flag
  if (distdiff >= Thfix && NumPredMode > 1 && intra_pred_flag)
    pred_mode
  ...

if (gps_alt_coordinates_flag)
   num_virtual_node_gt0
   if (num_virtual_node_gt0)
    num_virtual_node_gt1
    if (num_virtual_node_gt1)
     num_virtual_node_minus2 for (j=0; j<3; j++) {
   if (pred_mode != 0)
    residual_is_zero
   if (!residual_is_zero) {
    if ((j>0 && gps_alt_coordinates_flag) || pred_mode > 0 || intra_pred_flag=0))
     residual_sign
    residual_bitcount_minus1
    for (k=0; k<residual_bitcount;++k) {
     residual_bit[k]
    }
   }
  }
 ...
 }
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2022/017695 filed on Apr. 13, 2022, claiming the benefit of priority of U.S. Provisional Patent Application No. 63/177,619 filed on Apr. 21, 2021, the entire contents of which are hereby incorporated by reference.

FIELD

The present disclosure relates to a three-dimensional data encoding method, a three-dimensional data decoding method, a three-dimensional data encoding device, and a three-dimensional data decoding device.

BACKGROUND

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (see, for example, Patent Literature (PTL) 1).

CITATION LIST

Patent Literature

PTL 1: International Publication WO 2014/020663

A three-dimensional data encoding method according to an aspect of the present disclosure includes: calculating a predicted value of a position of a three-dimensional point according to one of inter prediction and intra prediction; calculating a residual between the predicted value and the position; arithmetic-encoding the residual using a first context when the predicted value is calculated according to the inter prediction; and arithmetic-encoding the residual using a second context different from the first context when the predicted value is calculated according to the intra prediction, wherein the residual is expressed by third residual information indicating a bit count of the residual.

A three-dimensional data decoding method according to an aspect of the present disclosure includes: obtaining a residual between a position of a three-dimensional point and a predicted value of the position, the predicted value being calculated according to one of inter prediction and intra prediction; arithmetic-decoding the residual using a first context when the predicted value is calculated according to the inter prediction; and arithmetic-decoding the residual using a second context different from the first context when the predicted value is calculated according to the intra prediction, wherein the residual is expressed by third residual information indicating a bit count of the residual.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 7 illustrates an example of a syntax of a geometry parameter set (GPS).

FIG. 8 illustrates an example of a syntax of each three-dimensional point (Node of Predtree).

FIG. 9 illustrates an example of a syntax of geometry data.

DESCRIPTION OF EMBODIMENTS

Figure 1:
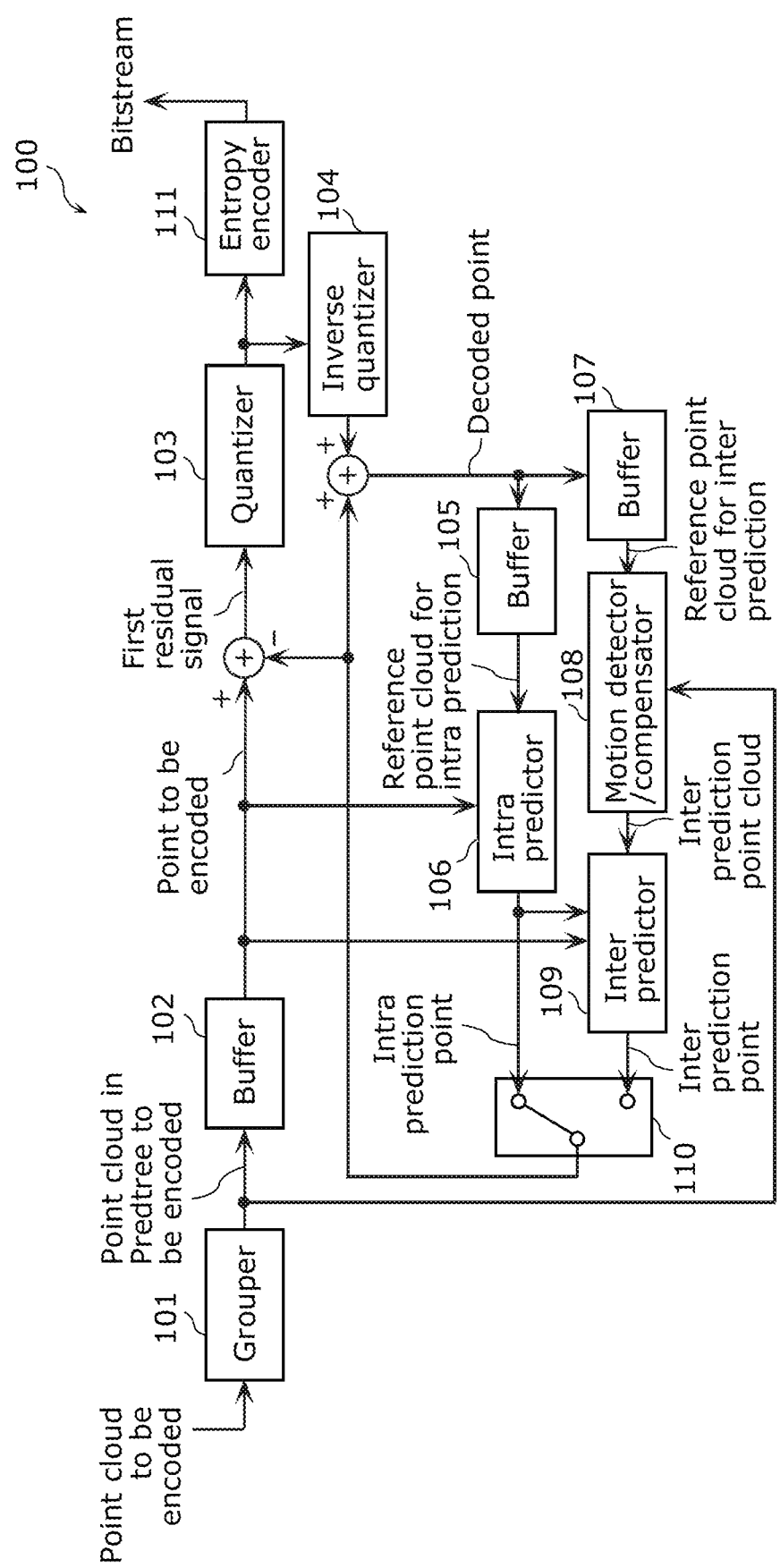
FIG. 1 is a block diagram of a three-dimensional data encoding device according to an embodiment.

A three-dimensional data encoding method according to an aspect of the present disclosure includes: calculating a predicted value of a position of a three-dimensional point according to one of inter prediction and intra prediction; calculating a residual between the predicted value and the position; arithmetic-encoding the residual using a first context when the predicted value is calculated according to the inter prediction; and arithmetic-encoding the residual using a second context different from the first context when the predicted value is calculated according to the intra prediction.

Accordingly, the three-dimensional data encoding method can encode a residual using a context that is in accordance with the prediction method, and thus may be able to improve coding efficiency.

For example, the residual may be expressed by first residual information indicating whether the residual is 0.

For example, the residual may be expressed by second residual information indicating whether the residual is positive or negative.

For example, the residual may be expressed by third residual information indicating a bit count of the residual.

For example, the three-dimensional data encoding method may further include: arithmetic-encoding, according to the inter prediction or the intra prediction, number information indicating a total number of virtual points to be used in calculating the predicted value. There are cases where the number of virtual points to be used in calculating the predicted value is different depending on the prediction method. Therefore, according to this aspect, by arithmetic-encoding number information indicating the number of virtual points, in accordance with the prediction method, it may be possible to improve encoding efficiency.

A three-dimensional data encoding method according to another aspect of the present disclosure includes: calculating a first predicted value of a first element of a position of a three-dimensional point and a second predicted value of a second element of the position, according to one of inter prediction and intra prediction; calculating a first residual between the first predicted value and the first element, and a second residual between the second predicted value and the second element; arithmetic-encoding the first residual using a first context and arithmetic-encoding the second residual using a second context, when the first predicted value and the second predicted value are calculated according to the inter prediction; and arithmetic-encoding the first residual using a third context different from the first context and arithmetic-encoding the second residual using the second context, when the first predicted value and the second predicted value are calculated according to the intra prediction.

Accordingly, the three-dimensional data encoding method can encode the first residual of the first element using a context that is in accordance with the prediction method, and thus can improve encoding efficiency.

For example, the first element may be a radius or a horizontal angle, and the second element may be an elevation angle. Since there are cases where the predicted value of the elevation angle tends to be the same between intra prediction and inter prediction, it may be possible to improve encoding efficiency by performing arithmetic encoding using a context that is common between intra prediction and inter prediction.

A three-dimensional data decoding method according to an aspect of the present disclosure includes: obtaining a residual calculated according to one of inter prediction and intra prediction; arithmetic-decoding the residual using a first context when the predicted value is calculated according to the inter prediction; and arithmetic-decoding the residual using a second context different from the first context when the predicted value is calculated according to the intra prediction.

Accordingly, the three-dimensional data decoding method can appropriately decode a residual using a context that is in accordance with the prediction method.

For example, the residual information may be expressed by first residual information indicating whether the residual is 0.

For example, the residual information may be expressed by second residual information indicating whether the residual is positive or negative.

For example, the residual information may be expressed by third residual information indicating a bit count of the residual.

For example, the three-dimensional data decoding method may further include: arithmetic-decoding, according to the inter prediction or the intra prediction, number information indicating a total number of virtual points to be used in calculating the predicted value. By performing arithmetic decoding that is in accordance with the prediction method, number information indicating the number of virtual points can be appropriately decoded.

Furthermore, a three-dimensional data decoding method according to another aspect of the present disclosure includes: obtaining a first predicted value of a first element of a position of a three-dimensional point, a second predicted value of a second element of the position, a first residual between the first predicted value and a value of the first element, and a second residual between the second predicted value and a value of the second element, the first predicted value and the second predicted value being calculated according to one of inter prediction and intra prediction; arithmetic-decoding the first residual using a first context and arithmetic-decoding the second residual using a second context different from the first context, when the first predicted value and the second predicted value are calculated according to the inter prediction; and arithmetic-decoding the first residual using a third context different from the first context and arithmetic-decoding the second residual using the second context, when the first predicted value and the second predicted value are calculated according to the intra prediction.

Accordingly, the three-dimensional data decoding method can appropriately decode the first residual of the first element using a context that is different between the inter prediction and the intra prediction.

For example, the first element may be a radius or a horizontal angle, and the second element may be an elevation angle.

Furthermore, a three-dimensional data encoding device according to an aspect of the present disclosure includes: a processor; and memory. Here, using the memory, the processor: calculates a predicted value of a position of a three-dimensional point according to one of inter prediction and intra prediction; calculates a residual between the predicted value and the position; arithmetic-encodes the residual using a first context when the predicted value is calculated according to the inter prediction; and arithmetic-encodes the residual using a second context different from the first context when the predicted value is calculated according to the intra prediction.

Accordingly, the three-dimensional data encoding device can encode a residual using a context that is in accordance with the prediction method, and thus may be able to improve encoding efficiency.

A three-dimensional data encoding device according to another aspect of the present disclosure includes: a processor; and memory. Here, using the memory, the processor: calculates a first predicted value of a first element of a position of a three-dimensional point and a second predicted value of a second element of the position, according to one of inter prediction and intra prediction; calculates a first residual between the first predicted value and the first element, and a second residual between the second predicted value and the second element; arithmetic-encodes the first residual using a first context and arithmetic-encodes the second residual using a second context, when the first predicted value and the second predicted value are calculated according to the inter prediction; and arithmetic-encodes the first residual using a third context different from the first context and arithmetic-encodes the second residual using the second context, when the first predicted value and the second predicted value are calculated according to the intra prediction.

Accordingly, the three-dimensional data encoding device can encode the first residual of the first element using a context that is in accordance with the prediction method, and thus can improve encoding efficiency.

Furthermore, a three-dimensional data decoding device according to an aspect of the present disclosure includes: a processor; and memory. Here, using the memory, the processor: obtains a residual calculated according to one of inter prediction and intra prediction; arithmetic-decodes the residual using a first context when the predicted value is calculated according to the inter prediction; and arithmetic-decodes the residual using a second context different from the first context when the predicted value is calculated according to the intra prediction.

Accordingly, the three-dimensional data decoding device can appropriately decode a residual using a context that is in accordance with the prediction method.

Furthermore, a three-dimensional data decoding device according to another aspect of the present disclosure includes: a processor; and memory. Here, using the memory, the processor: obtains a first predicted value of a first element of a position of a three-dimensional point, a second predicted value of a second element of the position, a first residual between the first predicted value and a value of the first element, and a second residual between the second predicted value and a value of the second element, the first predicted value and the second predicted value being calculated according to one of inter prediction and intra prediction; arithmetic-decodes the first residual using a first context and arithmetic-decodes the second residual using a second context different from the first context, when the first predicted value and the second predicted value are calculated according to the inter prediction; and arithmetic-decodes the first residual using a third context different from the first context and arithmetic-decodes the second residual using the second context, when the first predicted value and the second predicted value are calculated according to the intra prediction.

Accordingly, the three-dimensional data decoding device can appropriately decode the first residual of the first element using a context that is in accordance with the prediction method.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

EMBODIMENT

In the present embodiment, the case where one of inter prediction and intra prediction is performed on geometry information of a point cloud (point cloud) in a switching manner will be described.

FIG. 1 is a block diagram of three-dimensional data encoding device 100 according to the present embodiment. FIG. 1 illustrates processors relating to encoding geometry information (geometry) of a point cloud. However, three-dimensional data encoding device 100 may include other processors such as processors that performs encoding or the like of attribute information of the point cloud. In inter prediction and intra prediction, a point cloud to be encoded is encoded while an encoded point cloud is referred to.

Here, inter prediction is a prediction method of calculating a predicted value using a second reference three-dimensional point belonging to a second three-dimensional point cloud (second frame) different from a first three-dimensional point cloud (first frame) to which the current three-dimensional point to be encoded or decoded belongs. Inter prediction is a prediction method of calculating a predicted value using a first reference three-dimensional point belonging to a first three-dimensional point cloud (first frame) to which the current three-dimensional point to be encoded or decoded belongs.

Three-dimensional data encoding device 100 includes grouper 101, buffer 102, quantizer 103, inverse quantizer 104, buffer 105, intra predictor 106, buffer 107, motion detector/compensator 108, inter predictor 109, switcher 110, and entropy encoder 111.

From a target point cloud which is data of an input point cloud to be encoded, grouper 101 extracts a point cloud to be a prediction tree (Predtree) which is a unit for encoding and sets the point cloud as one group. In the input target point clouds, a position of a point cloud is represented by three-dimensional coordinates (e.g., x, y, z). Buffer 102 retains a generated prediction tree. For example, buffer 102 may initialize retained data for each prediction tree. Three-dimensional points included in a prediction tree (Predtree) retained in buffer 102 are subjected one by one to a process of encoding. The three-dimensional coordinates may be represented by Cartesian coordinates or may be expressed by polar coordinates. Hereinafter, geometry information represented by Cartesian coordinates will be referred to as Cartesian-coordinate geometry information, and geometry information represented by polar coordinates will be referred to as polar-coordinate geometry information.

Then, a difference (first residual signal) between each of the three-dimensional points included in the prediction tree (Predtree) and a selected prediction point is calculated. This first residual signal will be referred to also as a prediction residual. The first residual signal is an example of a first residual.

Quantizer 103 quantizes the first residual signal. Entropy encoder 111 entropy encodes the quantized first residual signal to generate encoded data and outputs (generates) a bitstream including the encoded data.

Inverse quantizer 104 inverse quantizes the first residual signal quantized by quantizer 103. The inverse quantized first residual signal is added to a predicted value based on the selected prediction point (one or more candidate points) to be decoded as a three-dimensional point (reference point) to be used in the intra prediction and the inter prediction. The predicted value is calculated based on geometry information of one or more candidate points as described in the embodiment. Buffer 105 retains a decoded reference point cloud for the intra prediction. For example, buffer 105 may initialize retained data for each prediction tree (target point cloud). Buffer 107 retains a reference point cloud for the inter prediction. For example, buffer 107 may initialize retained data for each prediction tree (target point cloud).

Intra predictor 106 determines an intra prediction point to be used in the prediction by a predetermined method while referring to information in a prediction tree (Predtree) including a current three-dimensional point to be encoded, such as three-dimensional points included in the prediction tree (the reference point cloud for the intra prediction). For example, intra predictor 106 may determine the intra prediction point by, for example, extrapolation using two three-dimensional points (decoded points) that are inverse quantized immediately before the current three-dimensional point (e.g., an ancestor node in the prediction tree such as a parent node).

Motion detector/compensator 108 generates an inter prediction point cloud which is a reference point cloud for the inter prediction after alignment, by reproducing the encoded point cloud based on the three-dimensional points (decoded points) included in the prediction tree (Predtree) including the current three-dimensional point, detecting a displacement between the encoded point cloud and the point cloud to be encoded (motion detection), and correcting the encoded point cloud based on the detected displacement (motion compensation).

Based on the inter prediction point cloud subjected to the motion compensation, inter predictor 109 determines an inter prediction point to be used in the prediction, by a predetermined method. For example, from the inter prediction point cloud, inter predictor 109 may select a point nearest to the intra prediction point as the inter prediction point or may select, without reference to the intra prediction point, a three-dimensional point (e.g., a three-dimensional point nearest to a three-dimensional point encoded immediately before the current three-dimensional point) in the vicinity of a three-dimensional point encoded immediately before the current three-dimensional point (or encoded last) (e.g., a three-dimensional point corresponding to an ancestor node in the prediction tree such as a parent node).

Switcher 110 determines a prediction point to be used in the prediction by selecting one of the intra prediction point and the inter prediction point. In this manner, three-dimensional data encoding device 100 determines geometry information of one or more candidate points from among encoded three-dimensional points as a prediction point and calculates a predicted value based on the prediction point. Intra predictor 106 and inter predictor 109 determines a prediction point (an intra prediction point or an inter prediction point) based on a three-dimensional point encoded immediately before the current three-dimensional point. In other words, three-dimensional data encoding device 100 determines one or more candidate points for calculating the predicted value based on one or more base points from among the encoded three-dimensional points. The one or more base points are three-dimensional points to be encoded immediately before the current three-dimensional point and may be, for example, a three-dimensional point corresponding to a parent node (ancestor node) of one three-dimensional point to be encoded in the prediction tree.

It should be noted that three-dimensional data encoding device 100 may select one of the intra prediction point and the inter prediction point as the prediction point under a procedure illustrated in a flowchart in FIG. 3 described later. Information relating to the prediction (prediction information) as to whether to select one of the intra prediction point and the inter prediction point as the prediction point may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each three-dimensional point, or may be written in such a manner as to be interleaved between three-dimensional points. The reference point cloud for the inter prediction may be a point cloud included in an encoded frame different from a frame to be encoded or may be an encoded point cloud included in the same frame as the frame to be encoded.

In this manner, three-dimensional data encoding device 100 predicts a point to be encoded using the inter prediction in addition to the intra prediction, so that there is a possibility that an amount of information of a first residual signal to be entropy encoded can be reduced, and thus coding efficiency can be improved.

It should be noted that three-dimensional data encoding device 100 need not always refer to an inter prediction point. Three-dimensional data encoding device 100 may perform the encoding based only on information of a point cloud to be encoded by, for example, initializing buffer 107 storing a reference point cloud for the inter prediction at predetermined time intervals (e.g., every 1 second, etc.), at predetermined frame intervals (e.g., every 30 frames, etc.), or at any timing for notifying a three-dimensional data decoding device. Accordingly, the corresponding three-dimensional data decoding device is enabled to start a jump playback from a point cloud that is not a beginning of a bitstream and for which an inter prediction point is not referred to, so that there is a possibility that random accessibility or error tolerance of the bitstream can be improved.

In a case where three-dimensional data encoding device 100 has coordinates of an input point cloud to be encoded represented by Cartesian coordinates as geometry information, three-dimensional data encoding device 100 encodes the geometry information indicated by the coordinates represented by Cartesian coordinates. In a case where three-dimensional data encoding device 100 has coordinates of an input point cloud to be encoded represented by polar coordinates as geometry information, three-dimensional data encoding device 100 encodes the geometry information indicated by the coordinates represented by polar coordinates.

Figure 2:
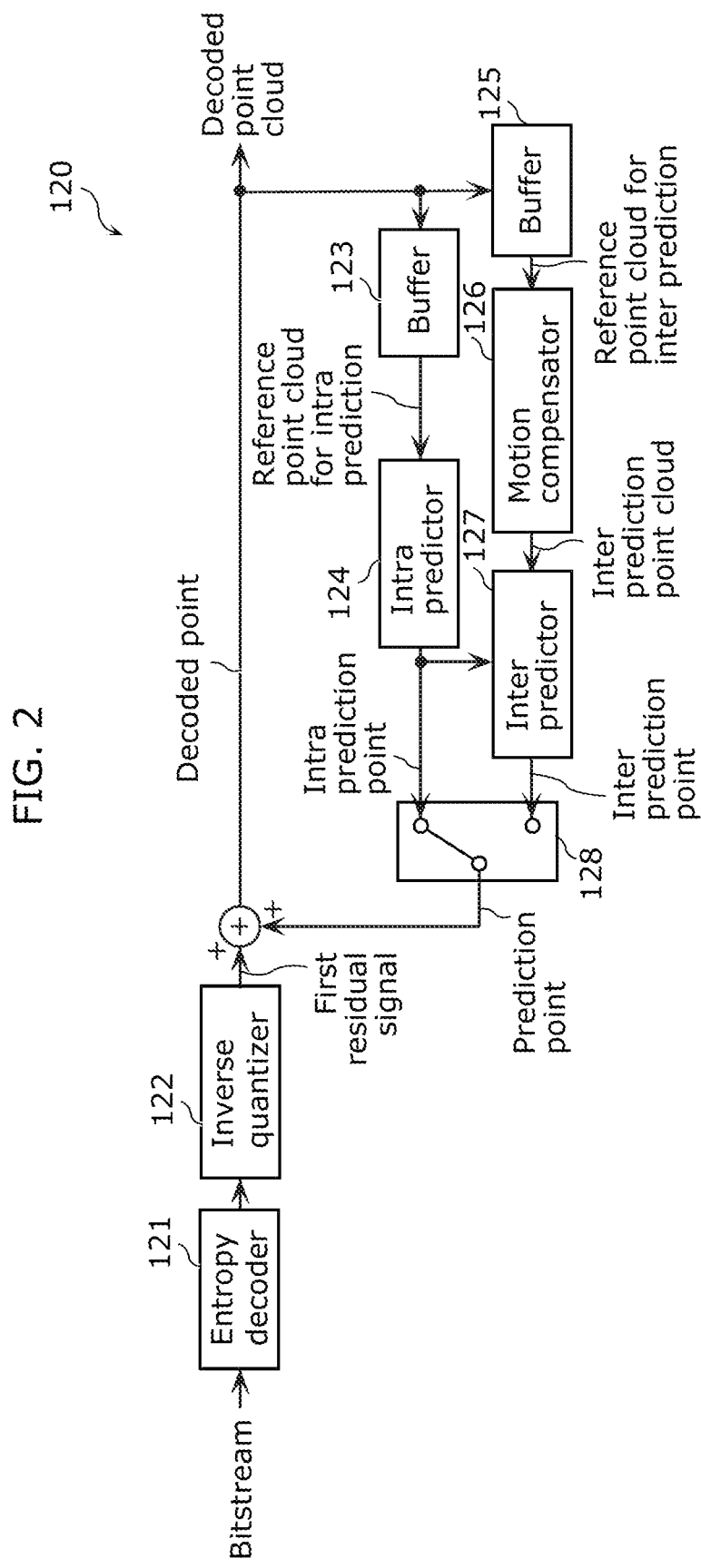
FIG. 2 is a block diagram of a three-dimensional data decoding device according to the embodiment.

FIG. 2 is a block diagram of three-dimensional data decoding device 120 according to the present embodiment. FIG. 2 illustrates processors relating to decoding geometry information (geometry) of a point cloud. However, three-dimensional data decoding device 120 may include other processors such as processors that perform decoding or the like of attribute information of the point cloud. Three-dimensional data decoding device 120 performs inter prediction decoding, in which a point cloud to be decoded is decoded while a decoded point cloud is referred to. For example, three-dimensional data decoding device 120 decodes a bitstream generated by three-dimensional data encoding device 100 illustrated in FIG. 1.

Three-dimensional data decoding device 120 includes entropy decoder 121, inverse quantizer 122, buffer 123, intra predictor 124, buffer 125, motion compensator 126, inter predictor 127, and switcher 128.

Three-dimensional data decoding device 120 obtains a bitstream generated by three-dimensional data encoding device 100.

Entropy decoder 121 entropy decodes the input bitstream for each three-dimensional point in a prediction tree (Predtree) to generate a quantized first residual signal. Inverse quantizer 122 inverse quantizes the quantized first residual signal to reproduce the first residual signal. The first residual signal for each three-dimensional point is added to a predicted value based on a prediction point corresponding to the three-dimensional point and then generated (output) as a decoded point. In other words, three-dimensional data decoding device 120 adds the predicted value and the prediction residual together to calculate geometry information of one three-dimensional point to be decoded.

Buffer 123 retains the generated decoded points as a reference point cloud for intra prediction. For example, buffer 123 may initialize retained data for each prediction tree (target point cloud). Buffer 125 retains the generated decoded points as a reference point cloud for inter prediction. For example, buffer 125 may initialize retained data for each prediction tree (target point cloud).

Intra predictor 124 determines an intra prediction point to be used in the prediction by a predetermined method while referring to information in a prediction tree (Predtree) including a current three-dimensional point to be decoded, such as three-dimensional points included in the prediction tree (the reference point cloud for the intra prediction). For example, intra predictor 124 may determine the intra prediction point by, for example, extrapolation using two three-dimensional points (decoded points) that are inverse quantized immediately before the current three-dimensional point (e.g., an ancestor node in the prediction tree such as a parent node).

Motion compensator 126 generates an inter prediction point cloud which is a reference point cloud for the inter prediction after alignment, by reproducing the decoded point cloud based on the three-dimensional points (decoded points) included in the prediction tree (Predtree) including the current three-dimensional point and correcting a displacement between the decoded point cloud and the point cloud to be decoded (motion compensation).

Based on the inter prediction point cloud subjected to the motion compensation, inter predictor 127 determines an inter prediction point to be used in the prediction, by a predetermined method. For example, from the inter prediction point cloud, inter predictor 127 may select a point nearest to the intra prediction point as the inter prediction point or may select, without reference to the intra prediction point, a three-dimensional point (e.g., a three-dimensional point nearest to a three-dimensional point decoded immediately before the current three-dimensional point) in the vicinity of a three-dimensional point decoded immediately before the current three-dimensional point (e.g., a three-dimensional point corresponding to an ancestor node in the prediction tree such as a parent node).

Switcher 128 determines a prediction point to be used in the prediction by selecting one of the intra prediction point and the inter prediction point. In this manner, three-dimensional data decoding device 120 determines geometry information of one or more candidate points from among decoded three-dimensional points as a prediction point and calculates a predicted value based on the prediction point. Intra predictor 124 and inter predictor 127 determines a prediction point (an intra prediction point or an inter prediction point) based on a three-dimensional point decoded immediately before the current three-dimensional point. In other words, three-dimensional data decoding device 120 determines one or more candidate points for calculating the predicted value based on one or more base points from among the decoded three-dimensional points. The one or more base points are three-dimensional points to be encoded immediately before the current three-dimensional point and may be, for example, a three-dimensional point corresponding to a parent node (ancestor node) of one three-dimensional point to be decoded in the prediction tree.

It should be noted that three-dimensional data decoding device 120 may select one of the intra prediction point and the inter prediction point as the prediction point under a procedure illustrated in a flowchart in FIG. 4 described later. Three-dimensional data decoding device 120 may select one of the intra prediction point and the inter prediction point as the prediction point based on information relating to the prediction (prediction information) as to whether to select one of the intra prediction point and the inter prediction point as the prediction point. The prediction information may be entropy encoded and written in a header part of each three-dimensional point or may be written in such a manner as to be interleaved between three-dimensional points. Information relating to the motion compensation such as motion vectors may be written in a header part of a frame or a prediction tree (Predtree), may be entropy encoded and written in a header part of each point, or may be written in such a manner as to be interleaved between three-dimensional points. In this manner, three-dimensional data decoding device 120 may be notified of the prediction information or the information relating to the motion compensation by corresponding three-dimensional data encoding device 100. The reference point cloud for the inter prediction may be a point cloud included in an encoded frame different from a frame to be encoded or may be an encoded point cloud included in the same frame as the frame to be encoded.

In this manner, three-dimensional data decoding device 120 predicts a point to be decoded using the inter prediction in addition to the intra prediction, thereby being capable of decoding a point cloud from a bitstream that is encoded while a decoded point cloud is referred to (e.g., the bitstream output from three-dimensional data encoding device 100 in FIG. 1).

It should be noted that three-dimensional data decoding device 120 need not always refer to an inter prediction point. Three-dimensional data decoding device 120 may perform the decoding based only on information of a point cloud to be decoded by, for example, initializing buffer 125 storing a reference point cloud for the inter prediction at predetermined time intervals (e.g., every 1 second, etc.), at predetermined frame intervals (e.g., every 30 frames, etc.), or at any timing for being notified by corresponding three-dimensional data encoding device 100. Accordingly, three-dimensional data decoding device 120 is enabled to start a jump playback from a point cloud that is not a beginning of a bitstream and for which an inter prediction point is not referred to, so that there is a possibility that random accessibility or error tolerance of the bitstream can be improved.

In a case where a bitstream has encoded data into which geometry information indicated by coordinates represented by Cartesian coordinates is encoded, three-dimensional data decoding device 120 decodes the geometry information indicated by the coordinates represented by Cartesian coordinates. In a case where a bitstream has encoded data into which geometry information indicated by coordinates represented by polar coordinates is encoded, three-dimensional data decoding device 120 decodes the geometry information indicated by the coordinates represented by polar coordinates.

Figure 3:
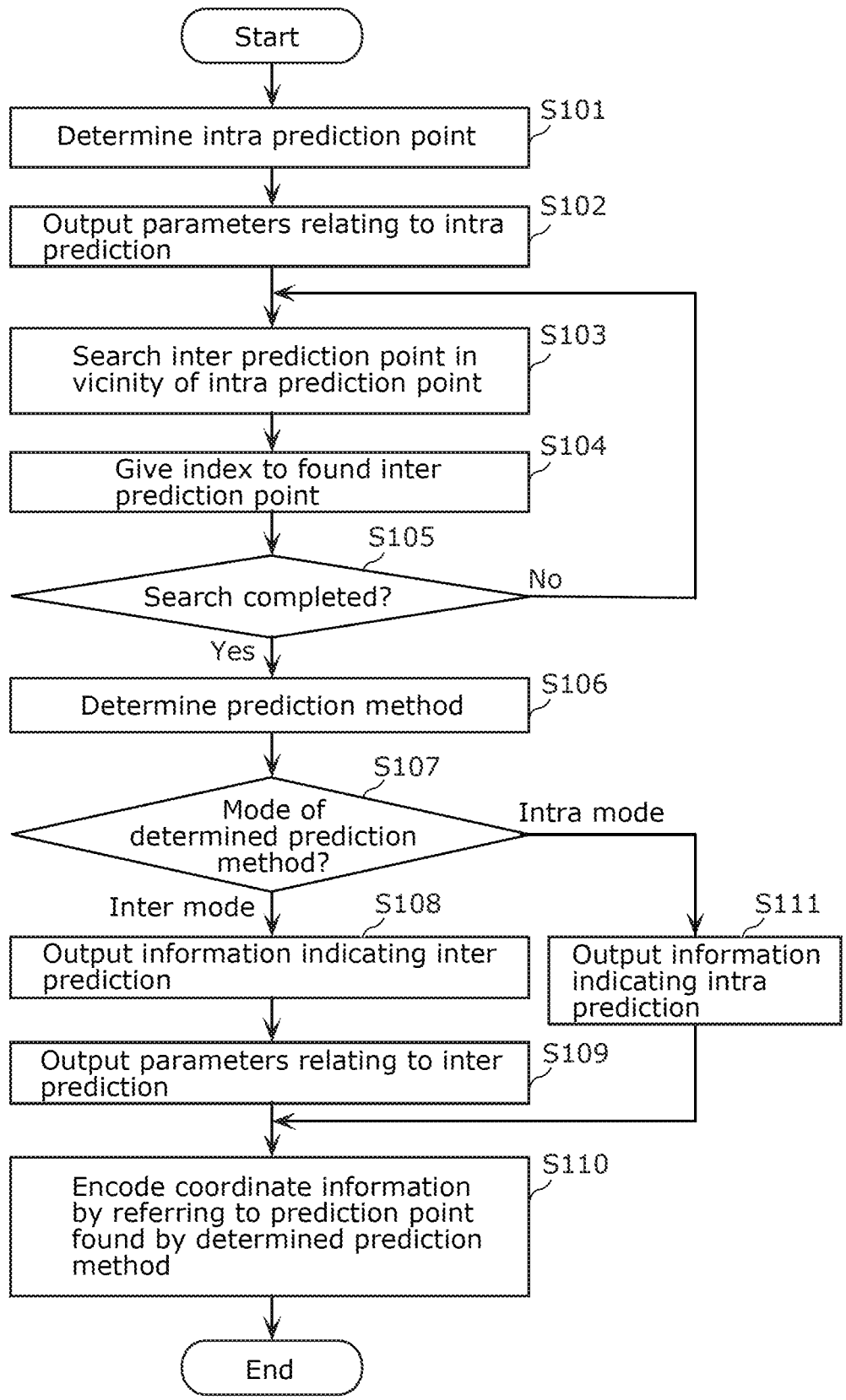
FIG. 3 is a flowchart illustrating an example of a procedure of encoding each three-dimensional point in a prediction tree (Predtree) by the three-dimensional data encoding device.

FIG. 3 is a flowchart illustrating an example of a procedure of encoding each three-dimensional point in a prediction tree (Predtree) by three-dimensional data encoding device 100.

In this example, three-dimensional data encoding device 100 first determines an intra prediction point from a reference point cloud for intra prediction (S101). Three-dimensional data encoding device 100 may determine the intra prediction point using, for example, a method for determining a prediction point using a prediction tree disclosed in the embodiment already described. For example, three-dimensional data encoding device 100 may generate a prediction tree using encoded three-dimensional points and select one or more candidate points from the encoded three-dimensional points based on the prediction tree. Three-dimensional data encoding device 100 may determine, as the intra prediction point, a prediction point that gives the smallest code amount from among at least one intra prediction point that is determined by at least one of the methods described above. Three-dimensional data encoding device 100 may determine, as the intra prediction point, a prediction point that gives the smallest sum of absolute values (or sum of squares) of coordinate residuals from among at least one intra prediction point that is determined by at least one of the methods described above.

Next, three-dimensional data encoding device 100 outputs parameters relating to intra prediction (S102). In a case where the number of candidates for the methods for determining an intra prediction point determined in step S101 is two or more, three-dimensional data encoding device 100 may output, to a bitstream, information of a selected candidate for the determining method as the parameters relating to intra prediction.

Next, three-dimensional data encoding device 100 determines an inter prediction point by referring to at least one candidate point that is extracted from an inter prediction point cloud. For example, three-dimensional data encoding device 100 may determine one candidate point as the inter prediction point or may determine, as the inter prediction point, a prediction point having coordinates that are average values of sets of coordinates of candidate points. Alternatively, three-dimensional data encoding device 100 may determine, as the inter prediction point, a prediction point having coordinates that are average values of sets of coordinates of the intra prediction point and at least one candidate point.

Here, as the at least one candidate point, three-dimensional data encoding device 100 may search for a point that is positioned in the vicinity of the intra prediction point (S103).

Next, three-dimensional data encoding device 100 may give index values to at least one determined inter prediction point in such a manner that a smaller index value is given to an inter prediction point nearer to the intra prediction point (S104).

Next, three-dimensional data encoding device 100 determines whether the search has completed (S105). In a case where the search has completed (Yes in S105), the procedure proceeds to next step S106, and in a case where the search has not completed (No in S105), the procedure returns to step S103. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data encoding device 100 determines a prediction method (S106). Specifically, three-dimensional data encoding device 100 determines the intra prediction or the inter prediction as a method for determining a prediction point. In other words, three-dimensional data encoding device 100 determines which of the intra prediction point and the inter prediction point is determined as the prediction point. For example, three-dimensional data encoding device 100 may determine, as the prediction method, a method for predicting a prediction point that gives a smaller code amount from between the intra prediction point and the inter prediction point. Three-dimensional data encoding device 100 may determine, as the prediction method, a method for predicting a prediction point that gives a smaller sum of absolute values (or sum of squares) of coordinate residuals from between the intra prediction point and the inter prediction point.

Three-dimensional data encoding device 100 determines whether a mode of the determined prediction method is an inter mode indicating that the prediction method is the inter prediction or an intra prediction mode indicating that the prediction method is the intra prediction (S107).

In a case where the determined prediction method is the inter prediction (inter mode in S107), three-dimensional data encoding device 100 outputs identification information indicating that an inter prediction point is determined as a prediction point (e.g., flag) to the bitstream (S108).

Next, three-dimensional data encoding device 100 outputs, to the bitstream, information of the number of candidate points to be used for determining coordinates of the inter prediction point, index values of the candidate points to be used, and the like, as parameters relating to inter prediction (S109). The index values may be assigned to one or more candidate points to be used for determining the predicted value.

In a case where the determined method for the prediction is the intra prediction (intra mode in S107), three-dimensional data encoding device 100 outputs identification information indicating that an intra prediction point is determined as the prediction point (e.g., flag) to the bitstream (S111). The items of identification information in step S108 and step S111 are items of information indicating which of the inter prediction point and the intra prediction point is determined as the prediction point.

After step S109 or step S111, three-dimensional data encoding device 100 encodes coordinate information of a current three-dimensional point to be encoded by referring to the prediction point found by the determined prediction method (S110).

In this manner, three-dimensional data encoding device 100 determines at least one inter prediction point by referring to the inter prediction point cloud and the intra prediction point, determines the method for finding the prediction point from the intra prediction point and the inter prediction point, and encodes geometry information (coordinate information) of the current three-dimensional point by referring to the prediction point.

Three-dimensional data encoding device 100 may be configured, in S103, to search for the inter prediction point, without referring to the intra prediction point, in the vicinity of a three-dimensional point that is uniquely determined independently of the parameters relating to intra prediction, such as a three-dimensional point encoded immediately before the current three-dimensional point (e.g., a three-dimensional point corresponding to an ancestor node in the prediction tree such as a parent node). In this case, three-dimensional data encoding device 100 may be configured not to perform S102 immediately after S101 but to perform S102 immediately after S111.

Figure 4:
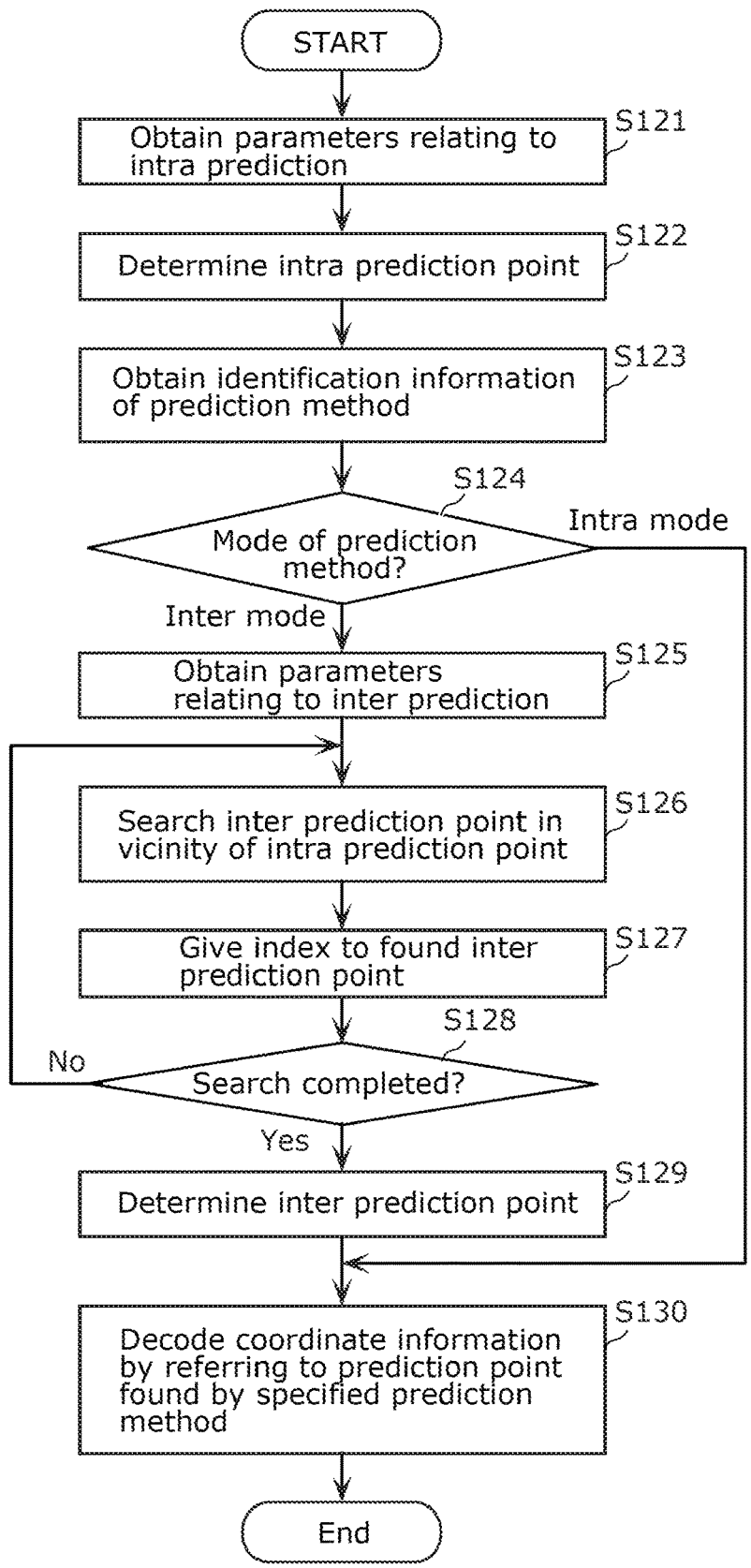
FIG. 4 is a flowchart illustrating an example of a procedure of decoding each three-dimensional point in a prediction tree (Predtree) by the three-dimensional data decoding device.

FIG. 4 is a flowchart illustrating an example of a procedure of decoding each three-dimensional point in a prediction tree (Predtree) by three-dimensional data decoding device 120. FIG. 4 provides decoding of a bitstream that is generated under the procedure of encoding in FIG. 3. In other words, the bitstream includes encoded first residual signals (prediction residuals) and index values that are assigned to candidate points to be used for calculating a predicted value.

In this example, three-dimensional data decoding device 120 first obtains the parameters relating to intra prediction from the bitstream (S121).

Next, based on the parameters relating to intra prediction, three-dimensional data decoding device 120 determines an intra prediction point (S122). Specifically, three-dimensional data decoding device 120 determines the intra prediction point by the same method as step S101 in FIG. 3. Three-dimensional data decoding device 120 is notified of the parameters relating to intra prediction by corresponding three-dimensional data encoding device 100 and determines the intra prediction point based on the parameters relating to intra prediction. The parameters relating to intra prediction are obtained in step S121 and include information for specifying at least one method for determining the intra prediction point and a parameter accompanying the information.

Next, three-dimensional data decoding device 120 obtains identification information indicating a mode of the prediction method from the bitstream (S123).

Next, three-dimensional data decoding device 120 determines whether the obtained identification information indicates the inter mode indicating that the prediction mode is the inter prediction or the intra prediction mode indicating that the prediction method is the intra prediction (S124).

In a case where the prediction method is the inter prediction (inter mode in S124), three-dimensional data decoding device 120 obtains parameters relating to inter prediction from the bitstream (S125).

Next, three-dimensional data decoding device 120 performs processes for determining an inter prediction point (S126 to S129). Specifically, three-dimensional data decoding device 120 determines the inter prediction point by the same method as steps S103 to S105 in FIG. 3. For example, three-dimensional data decoding device 120 determines the inter prediction point by referring to at least one candidate point that is extracted from an inter prediction point cloud. For example, three-dimensional data decoding device 120 may determine one candidate point as the inter prediction point or may determine, as the inter prediction point, a prediction point having coordinates that are average values of sets of coordinates of candidate points. Alternatively, three-dimensional data decoding device 120 may determine, as the inter prediction point, a prediction point having coordinates that are average values of sets of coordinates of the intra prediction point and at least one candidate point.

Here, as the at least one candidate point, three-dimensional data decoding device 120 may search for a point that is positioned in the vicinity of the intra prediction point (S126).

Next, three-dimensional data decoding device 120 may give index values to at least one determined inter prediction point in such a manner that a smaller index value is given to an inter prediction point nearer to the intra prediction point (S127).

Next, three-dimensional data decoding device 120 determines whether the search has completed (S128). In a case where the search has completed (Yes in S128), the procedure proceeds to next step S129, and in a case where the search has not completed (No in S128), the procedure returns to step S126. The completion may be determined by finding a predetermined number of inter prediction points, may be determined by completion of a search of the entire point cloud within a predetermined range, or may be determined by satisfaction of one of finding the predetermined number of inter prediction points and the completion of a search of the entire point cloud within the predetermined range.

Next, three-dimensional data decoding device 120 determines the inter prediction point based on the parameters relating to inter prediction while referring to the inter prediction point cloud and the intra prediction point (S129). For example, three-dimensional data decoding device 120 determines the inter prediction point by identifying candidate points to be used for determining coordinates of the inter prediction point based on the information of the number of candidate points to be used for determining coordinates of the inter prediction point and the index values assigned to the candidate points to be used that are included in the parameters relating to inter prediction and by determining coordinates of the inter prediction point using the identified candidate points. In other words, three-dimensional data decoding device 120 selects one candidate point from decoded three-dimensional points based on the index values included in the bitstream.

After step S129 or in a case of the intra mode in step S124, three-dimensional data decoding device 120 decodes geometry information (coordinate information) of a current three-dimensional point to be decoded by referring to the prediction point found by the specified prediction method (S130).

In this manner, in the case where the prediction method is the inter prediction, three-dimensional data decoding device 120 decodes the coordinate information of the point to be decoded by referring to the inter prediction point, and in the case where the prediction method is the intra prediction, three-dimensional data decoding device 120 decodes the coordinate information of the point to be decoded by referring to the intra prediction point.

Three-dimensional data decoding device 120 may be configured, in S126, to search for the inter prediction point, without referring to the intra prediction point, in the vicinity of a three-dimensional point that is uniquely determined independently of the parameters relating to intra prediction, such as a three-dimensional point decoded immediately before the current three-dimensional point (e.g., a three-dimensional point corresponding to an ancestor node in the prediction tree such as a parent node). In this case, three-dimensional data decoding device 120 may be configured to perform S121 and S122 not immediately before S123 but in the case where the intra mode is determined in S124.

Figure 5:
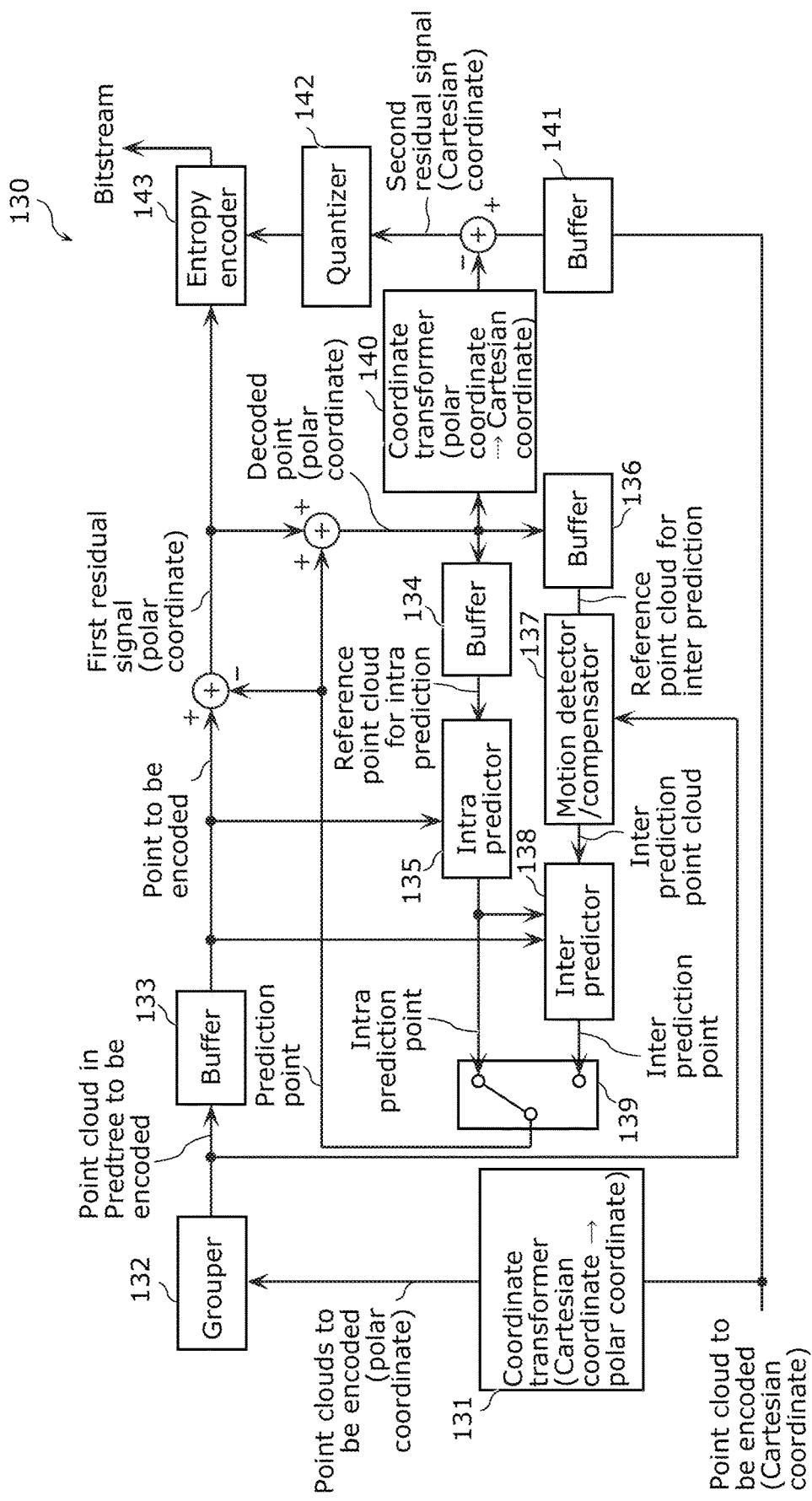
FIG. 5 is a block diagram of a three-dimensional data encoding device according to a variation of the embodiment.

FIG. 5 is a block diagram of three-dimensional data encoding device 130 according to a variation of the present embodiment. FIG. 5 illustrates processors relating to encoding geometry information (geometry) of a point cloud.

However, three-dimensional data encoding device 130 may include other processors such as processors that performs encoding or the like of attribute information of the point cloud. In inter prediction and intra prediction, a point cloud to be encoded is encoded while an encoded point cloud is referred to. Compared with three-dimensional data encoding device 100 in FIG. 1, three-dimensional data encoding device 130 differs in its configuration and operation in that coordinate transformer 131 for transforming a point cloud having items of geometry information represented by Cartesian coordinates to items of geometry information represented by polar coordinates and encoding the items of geometry information represented by polar coordinates is included, in that a prediction residual of geometry information represented by polar coordinates (a first residual signal) is not quantized, and in that a second residual signal in Cartesian coordinates, which is equivalent to an error that occurs in transformation between Cartesian coordinates and polar coordinates. At the same time, compared with three-dimensional data encoding device 100, three-dimensional data encoding device 130 is the same in its configuration and operation in regards other than the regards described above.

Three-dimensional data encoding device 130 includes coordinate transformer 131, grouper 132, buffer 133, buffer 134, intra predictor 135, buffer 136, motion detector/compensator 137, inter predictor 138, switcher 139, coordinate transformer 140, buffer 141, quantizer 142, and entropy encoder 143.

Coordinate transformer 131 transforms a coordinate system of geometry information of a target point cloud which is data of an input point cloud to be encoded from a Cartesian coordinate system to a polar coordinate system. In other words, coordinate transformer 131 transforms a coordinate system of Cartesian-coordinate geometry information of one three-dimensional point to be encoded to generate polar-coordinate geometry information. The point cloud to be encoded that is transformed in polar coordinates is output to grouper 132.

From the target point cloud being the point cloud to be encoded that is transformed in polar coordinates grouper 132 extracts a point cloud to be a prediction tree (Predtree) which is a unit for encoding, and sets the point cloud as one group. Buffer 133 retains a generated prediction tree. For example, buffer 133 may initialize retained data for each prediction tree. Three-dimensional points included in a prediction tree (Predtree) retained in buffer 133 are subjected one by one to a process of encoding.

A difference between each of three-dimensional points included in the prediction tree retained in buffer 133 (each point to be encoded) and a prediction point selected for the point to be encoded (first residual signal) is calculated. The first residual signal is a residual signal of geometry information represented in polar coordinates. The first residual signal will be referred to also as a prediction residual. The first residual signal is an example of a first residual. Since items of geometry information of the three-dimensional points retained in buffer 133 are transformed into the polar coordinate system, the first residual is a difference between a transformed polar-coordinate geometry information and a predicted value.

Then, the first residual signal and the prediction point are added together and retained in buffers 134 and 136 as a decoded point subjected to the encoding process. Geometry information of the decoded point retained in buffers 134 and 136 is represented by polar coordinates. In this regard, buffers 134 and 136 differ in function from buffers 105 and 107 but are the same in function as buffers 105 and 107 in other respects, respectively.

Likewise, intra predictor 135, motion detector/compensator 137, inter predictor 138, and switcher 139 differ in function from intra predictor 106, motion detector/compensator 108, inter predictor 109, and switcher 110 in that geometry information of a three-dimensional point to be processed is represented by polar coordinates but are the same in function as intra predictor 106, motion detector/compensator 108, inter predictor 109, and switcher 110 in other respects, respectively.

Coordinate transformer 140 obtains the same decoded point as the decoded point retained in buffers 134 and 136 and transforms a coordinate system of geometry information of the obtained decoded point from the polar coordinate system to the Cartesian coordinate system. In other words, coordinate transformer 140 inversely transforms the coordinate system of the polar-coordinate geometry information transformed by coordinate transformer 131 to generate Cartesian-coordinate geometry information.

Buffer 141 retains the geometry information of the three-dimensional point that is input into three-dimensional data encoding device 130 and represented by Cartesian coordinates.

Then, a difference (second residual signal) between the input Cartesian-coordinate geometry information and the Cartesian-coordinate geometry information of which the coordinate system is transformed from the polar coordinate system to the Cartesian coordinate system by coordinate transformer 140 is calculated. The second residual signal is an example of a second residual. In other words, the second residual signal is a difference between the Cartesian-coordinate geometry information that is not subjected to coordinate transformation by coordinate transformer 131 and the geometry information that is once transformed to polar coordinates and further inversely transformed to the Cartesian coordinate system. The second residual signal is a transformation error occurring in the coordinate transformation.

Quantizer 142 quantizes the second residual signal.

Entropy encoder 143 entropy encodes the first residual signal and the quantized second residual signal to generate items of encoded data and outputs a bitstream including the items of encoded data.

In this manner, three-dimensional data encoding device 130 transforms a coordinate system of geometry information of a three-dimensional point from the Cartesian coordinate system to the polar coordinate system and encodes polar-coordinate geometry information. Accordingly, in a case where a point cloud generated by obtaining a three-dimensional position of a neighbor object with respect to a sensor position, as in LiDAR, is encoded, an accuracy of predicting a point to be encoded can be improved, so that there is a possibility that coding efficiency can be improved.

Figure 6:
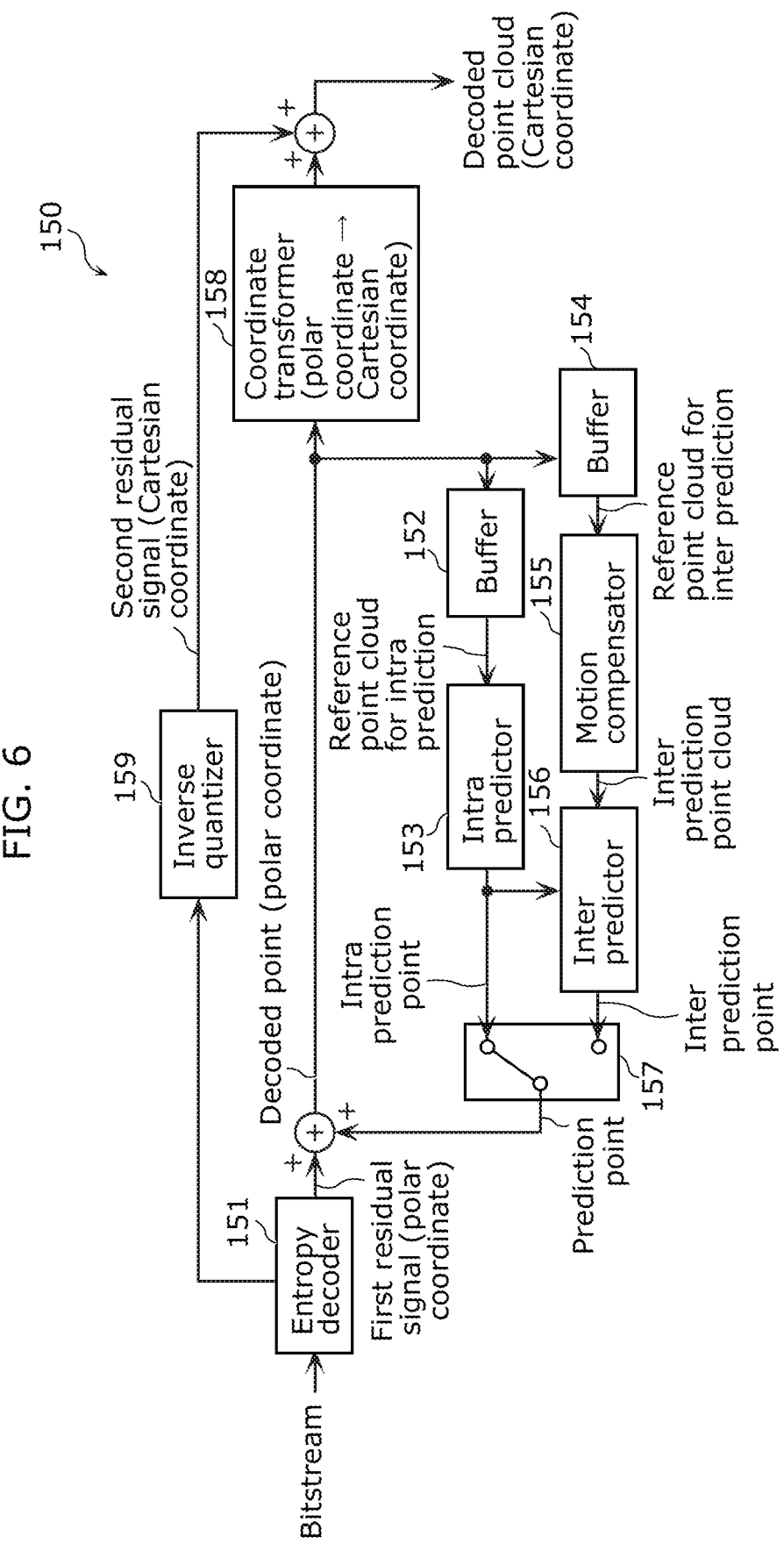
FIG. 6 is a block diagram of a three-dimensional data decoding device according to the variation of the embodiment.

FIG. 6 is a block diagram of three-dimensional data decoding device 150 according to the variation of the present embodiment. FIG. 6 illustrates processors relating to decoding geometry information (geometry) of a point cloud. However, three-dimensional data decoding device 150 may include other processors such as processors that perform decoding or the like of attribute information of the point cloud. Three-dimensional data decoding device 150 performs inter prediction decoding, in which a point cloud to be decoded is decoded while a decoded point cloud is referred to. For example, three-dimensional data decoding device 150 decodes a bitstream generated by three-dimensional data encoding device 130 illustrated in FIG. 5. Compared with three-dimensional data decoding device 120 in FIG. 2, three-dimensional data decoding device 150 differs in its configuration and operation in that the inverse quantization of the first residual signal (prediction residual) is not performed and in that a second residual signal in Cartesian coordinates, which is equivalent to a transformation error occurring in transformation between Cartesian coordinates and polar coordinates is entropy decoded, inversely quantized, reproduced, added to a point that is transformed from a corresponding decoded point in polar coordinates into Cartesian coordinates, and output as a decoded point in Cartesian coordinates. At the same time, compared with three-dimensional data decoding device 120, three-dimensional data decoding device 150 is the same in regards other than the regards described above.

Three-dimensional data decoding device 150 includes entropy decoder 151, buffer 152, intra predictor 153, buffer 154, motion compensator 155, inter predictor 156, switcher 157, coordinate transformer 158, and inverse quantizer 159.

Entropy decoder 151 entropy decodes the input bitstream for each three-dimensional point in a prediction tree (Predtree) to generate a first residual signal and a quantized second residual signal. The first residual signal for each three-dimensional point is added to a predicted value based on a prediction point corresponding to the three-dimensional point and then generated (output) as a decoded point represented by polar coordinates.

Buffer 152 retains the generated decoded points as a reference point cloud for intra prediction. For example, buffer 152 may initialize retained data for each prediction tree (target point cloud). Buffer 154 retains the generated decoded points as a reference point cloud for inter prediction. For example, buffer 154 may initialize retained data for each prediction tree (target point cloud). Geometry information of the decoded point retained in buffers 152 and 154 is represented by polar coordinates. In this regard, buffers 152 and 154 differ in function from buffers 123 and 125 but are the same in function as buffers 123 and 125 in other respects, respectively.

Likewise, intra predictor 153, motion compensator 155, inter predictor 156, and switcher 157 differ in function from intra predictor 124, motion compensator 126, inter predictor 127, and switcher 128 in that geometry information of a three-dimensional point to be processed is represented by polar coordinates but are the same in function as intra predictor 124, motion compensator 126, inter predictor 127, and switcher 128 in other respects, respectively.

Coordinate transformer 158 obtains the same decoded point as the decoded point retained in buffers 152 and 154 and transforms a coordinate system of geometry information of the obtained decoded point from the polar coordinate system to the Cartesian coordinate system.

Inverse quantizer 159 inverse quantizes the quantized second residual signal to reproduce the second residual signal.

The Cartesian-coordinate geometry information obtained by the coordinate transformation by coordinate transformer 158 and the second residual signal reproduced by the inverse quantization by inverse quantizer 159 are added together and generate (output) as a decoded point including the Cartesian-coordinate geometry information.

In this manner, three-dimensional data decoding device 150 includes means for transforming a coordinate system of a decoded point having polar-coordinate geometry information from the polar coordinate system to the Cartesian coordinate system and adding the decoded point to the second residual signal in Cartesian coordinates that is equivalent to an error occurring in transformation between Cartesian-coordinate geometry information and polar-coordinate geometry information. Accordingly, three-dimensional data decoding device 150 is capable of decoding a point cloud from an encoded bitstream (e.g., a bitstream output from three-dimensional data encoding device 130 in FIG. 5) while referring to an encoded point cloud in polar coordinates.

FIG. 7 illustrates an example of a syntax of a geometry parameter set (GPS). The syntax is used in three-dimensional data encoding devices 100 and 130 and three-dimensional data decoding devices 120 and 150 described with respect to FIG. 1, FIG. 2, FIG. 5, and FIG. 6.

As illustrated in these examples, in the GPS, notification of information indicating whether to use a coordinate system other than the Cartesian coordinate system, such as the polar coordinate system, in a decoding process of each point, such as gps_alt_coordinates_flag, may be given. When a value of gps_alt_coordinates_flag is set to 1 (i.e., gps_alt_coordinates_flag=1), gps_alt_coordinates_flag indicates that an alternative coordinate system (e.g., polar coordinate system) is to be used in a decoding process of a data unit of geometry information in a bitstream in which the GPS is referred to. When a value of gps_alt_coordinates_flag is set to 0 (i.e., gps_alt_coordinates_flag=0), gps_alt_coordinates_flag indicates that no alternative coordinate system is to be used in the decoding process of the data unit of geometry information in the bitstream in which the GPS is referred to. In other words, gps_alt_coordinates_flag may indicate whether encoded data includes first encoded data that is calculated in the polar coordinate system. gps_alt_coordinates_flag is an example of first identification information which indicates whether encoded data includes first encoded data calculated in the polar coordinate system.

In a case where a coordinate system other than the Cartesian coordinate system (alternative coordinate system) such as the polar coordinate system is to be used in a decoding process of each three-dimensional point (e.g., in a case of gps_alt_coordinates_flag=1, etc.), notification of coordinate transformation information indicating whether to perform coordinate transformation of a decoded point (e.g., transform from the polar coordinate system to the Cartesian coordinate system, etc.) before each three-dimensional point is output from the three-dimensional data decoding device, such as gps_coordinate_trans_enabled_flag, may be given. The case of gps_alt_coordinates_flag=1 (i.e., the first identification information indicates that the encoded data includes the first encoded data) is specifically geometry information of one or more candidate points to be used for calculating a predicted value and geometry information of one three-dimensional point to be encoded to be used for calculating the first residual are items of polar-coordinate geometry information. In this case, the bitstream includes gps_coordinate_trans_enabled_flag. gps_coordinate_trans_enabled_flag is an example of second identification information which indicates whether polar-coordinate geometry information or Cartesian-coordinate geometry information is to be output in the decoding. In the case of gps_alt_coordinates_flag=1, in the encoding, three-dimensional data encoding devices 100 and 130, which quantize the first residual and encode the quantized first residual, encode polar-coordinate geometry information. Therefore, it can be said that, in a case of gps_alt_coordinates_flag=1 and gps_coordinate_trans_enabled_flag=0, polar-coordinate geometry information is encoded, and gps_coordinate_t- rans_enabled_flag=0 indicates that polar-coordinate geometry information is to be output in the decoding.

In the case of gps_alt_coordinates_flag=0 (i.e., in a case where the first identification information indicates that the encoded data does not include the first encoded data), the bitstream need not include gps_coordinate_trans_enabled_flag (second identification information).

When a value of gps_coordinate_trans_enabled_flag is set to 1 (i.e., gps_coordinate_trans_enabled_flag=1), gps_coordinate_trans_enabled_flag indicates that a coordinate system is to be transformed to another coordinate system in the decoding process of the data unit of geometry information in the bitstream in which the GPS is referred to. Therefore, it can be said that, in a case of gps_alt_coordinates_flag=1 and gps_coordinate_trans_enabled_flag=0, Cartesian-coordinate geometry information is to be decoded, and thus gps_coordinate_trans_enabled_flag=0 indicates that Cartesian-coordinate geometry information is to be output in the decoding.

When the value of gps_coordinate_trans_enabled_flag is set to 0 (i.e., gps_coordinate_trans_enabled_flag=0), gps_coordinate_trans_enabled_flag indicates that a coordinate system is not to be transformed to another coordinate system in the decoding process of the data unit of geometry information in the bitstream in which the GPS is referred to. It should be noted that, when gps_coordinate_trans_enabled_flag is not provided, it may be considered that the value of gps_coordinate_trans_enabled_flag is set to 0.

It should be noted that in a case where the coordinate transformation of a decoded point is not performed before each three-dimensional point is output from the three-dimensional data decoding device (e.g., gps_coordinate_trans_enabled_flag=0), the encoding and decoding of a point cloud may be performed by three-dimensional data encoding device 100 illustrated in FIG. 1 and three-dimensional data decoding device 120 illustrated in FIG. 2. Further, in a case where the coordinate transformation of a decoded point is performed before each three-dimensional point is output from the three-dimensional data decoding device (e.g., gps_coordinate_trans_enabled_flag=1), the encoding and decoding of a point cloud may be performed by three-dimensional data encoding device 130 illustrated in FIG. 5 and three-dimensional data decoding device 150 illustrated in FIG. 6.

Giving the notification of gps_alt_coordinates_flag and gps_coordinate_trans_enabled_flag from the three-dimensional data encoding device to the three-dimensional data decoding device enables a switch between three-dimensional data encoding device 100 illustrated in FIG. 1 and three-dimensional data encoding device 130 illustrated in FIG. 5 based on a point cloud to be encoded even in the case where a coordinate system other than the Cartesian coordinate system, such as the polar coordinate system, in the encoding and decoding of each three-dimensional point (e.g., gps_alt_coordinates_flag=1, etc.), and there is accordingly a possibility that coding efficiency can be improved.

In FIG. 7, a syntax of the GPS is exemplified. However, gps_alt_coordinates_flag and gps_coordinate_trans_enabled_flag may be included in an SPS, may be included in a header of a data unit, or may be included as metadata in another type of control information.

FIG. 8 illustrates an example of a syntax of each three-dimensional point (Node of Predtree). The syntax is used in three-dimensional data encoding devices 100 and 130 and three-dimensional data decoding devices 120 and 150 described with respect to FIG. 1, FIG. 2, FIG. 5, and FIG. 6.

In this example, three-dimensional data encoding devices 100 and 130 first notify, respectively, three-dimensional data decoding devices 120 and 150 of identification information (pred_mode) that indicates how to find an intra prediction point for a current three-dimensional point to be encoded or to be decoded. Three-dimensional data encoding devices 100 and 130 may additionally notify, respectively, three-dimensional data decoding devices 120 and 150 of additional information for determining the intra prediction point, based on the identification information (pred_mode).

Next, in a case where the inter prediction is enabled in a GPS referred to by a prediction tree (predtree) being encoded (e.g., gps_inter_prediction_enabeled_flag=1), three-dimensional data encoding devices 100 and 130 may notify, respectively, three-dimensional data decoding devices 120 and 150 of information indicating whether the prediction method for the current three-dimensional point to be encoded or to be decoded is the intra prediction or not (i.e., the inter prediction) (intra_pred_flag). In a case of gps_inter_prediction_enabeled_flag=0, a value of intra_pred_flag may be set to 1 (the intra prediction). In a case where the prediction method for the current three-dimensional point to be encoded or to be decoded is the inter prediction (e.g., intra_pred_flag=0), notification of identification information indicating how to find an inter prediction point for the current three-dimensional point to be encoded or to be decoded (inter_pred_mode) may be given. Further, three-dimensional data encoding devices 100 and 130 may set, to NumRefPoints, the number of candidate points in an inter prediction point cloud that is referred to when the inter prediction point is determined based on the identification information (inter_pred_mode) and may notify, respectively, three-dimensional data decoding devices 120 and 150 of a number NumRefPoints of indices (inter_ref_point_idx) of the candidate points. In a case where a plurality of candidate points is specified in the inter prediction point cloud that is referred to when the inter prediction point is determined, average values of sets of coordinates of the specified candidate points may be used as coordinates of the inter prediction point. For three-dimensional data encoding devices 100 and 130, inter_pred_mode for omitting the notification of the indices of the candidate points and selecting a specific candidate point such as a candidate point having the smallest index may be prepared. For example, three-dimensional data encoding devices 100 and 130 may be allowed to omit the notification of the indices of the candidate points by providing a process of determining whether inter_pred_mode indicates such a mode or setting a value of NumRefPoints to 0. Such a mode can be carried out as long as notification of information necessary for a method by which the inter prediction point is uniquely determined is given. For example, in place of inter_pred_mode, notification of the number of candidate points in the inter prediction point cloud that is referred to when the inter prediction point is determined may be given.

In a case where a candidate point is searched for in an inter prediction point cloud in the vicinity of a three-dimensional point that is uniquely determined independent of the identification information (pred_mode) indicating how to find an intra prediction point, such as a three-dimensional point that is encoded or decoded immediately before the current three-dimensional point to be encoded or to be decoded (e.g., a three-dimensional point corresponding to an ancestor node in a prediction tree such as a parent node), three-dimensional data decoding devices 120 and 150 may be notified of the identification information (pred_mode) indicating how to find the intra prediction point and the additional information for determining the intra prediction point only in a case where the prediction method for the current three-dimensional point to be encoded or to be decoded is the intra prediction (e.g., intra_pred_flag=1).

Next, three-dimensional data encoding devices 100 and 130 may give notification of a first difference (1st_residual_value) between geometry information (coordinate values) of the point to be encoded or to be decoded and geometry information (coordinate values) of the prediction point. In the case where coordinate transformation of a decoded point is performed before each three-dimensional point is output from three-dimensional data decoding devices 120 and 150 (e.g., gps_coordinate_trans_enabled_flag=1), notification of a second difference (2nd_residual_value) between geometry information (coordinate values) obtained by performing coordinate transformation to an original coordinate system such as the Cartesian coordinate system on a result of decoding in another coordinate system such as the polar coordinate system and original geometry information (coordinate values) may be given. Although an example of giving the notification of these items of difference information in one type of syntax is described, the notification of the items of difference information may be given in types of syntax such as positive-negative information and absolute value information.

Giving the notification of these items of information from three-dimensional data encoding devices 100 and 130 to three-dimensional data decoding devices 120 and 150 enables the prediction process to be performed consistently between three-dimensional data encoding devices 100 and 130 and three-dimensional data decoding devices 120 and 150, thus enabling three-dimensional data decoding devices 120 and 150 to decode a three-dimensional point to be processed without causing inconsistency with corresponding three-dimensional data encoding devices 100 and 130, respectively.

FIG. 9 illustrates an example of a syntax of geometry data. This syntax is used by three-dimensional data encoding devices 100 and 130 and three-dimensional data decoding devices 120 and 150 described using FIG. 1, FIG. 2, FIG. 5, and FIG. 6.

pred_mode included in the syntax indicates a prediction mode for encoding and decoding geometry information of i-th three-dimensional point out of a plurality of three-dimensional points included in a point cloud. Specifically, pred_mode indicates a calculation method of a predicted value of the geometry information of the i-th three-dimensional point, and the calculation method uses geometry information of another three-dimensional point. pred_mode is indicated as a value from 0 to M−1 (M is a total number of prediction modes). In the case where pred_mode is not included in a bitstream (i.e., a condition of distdiff>=Thfix[i] && NumPredMode>1 && intra_pred_flag is not satisfied), a value indicated by pred_mode may be estimated at estimated value α (e.g., α=2). Note that estimated value α is not limited to 2 and may be any value from 0 to M−1. In the case where pred_mode is not included in a bitstream, estimated value α may be separately added to a header or the like. pred_mode may be binarized and arithmetic-encoded in truncated unary code using the number of prediction modes to which predicted values are allocated.

intra_pred_flag is information indicating whether a prediction method for a point to be encoded or decoded is the intra prediction or not (i.e., the inter prediction) (see FIG. 5). In the case of intra_pred_flag=0, that is, in the case where of the inter prediction, estimated value α of pred_mode may be omitted rather than being added to a bitstream. Accordingly, a code amount can be reduced. In this case, three-dimensional data decoding devices 120 and 150 may estimate that pred_mode is estimated value α (e.g., α=0). Note that estimated value α is not limited to 0 and may be any value from 1 to M−1. In the case where pred_mode is not included in a bitstream, estimated value α may be separately added to a header or the like.

num_virtual_node indicates the number of virtual nodes of the i-th three-dimensional point. A value of num_virtual_node may be used to correct the predicted value calculated in pred_mode. In the case of pred_mode=0 (e.g., prediction is not performed), num_virtual_node need not be added to a bitstream. Accordingly, a code amount in the case of pred_mode=0 can be reduced. In the case where num_virtual_node is not added to a bitstream, three-dimensional data decoding devices 120 and 150 may estimate that a value indicated by num_virtual_node is 0. Accordingly, three-dimensional data decoding devices 120 and 150 can decode the bitstream appropriately.

In the case where a coordinate system other than a Cartesian coordinate system, such as a polar coordinate system, is used in a decoding process of each point, such as gps_alt_coordinates_flag=1, num_virtual_node may be added. In the case of gps_alt_coordinates_flag=0, that is, in the case where a Cartesian coordinate system is used, num_virtual_node need not be added. Accordingly, in the case where encoding is performed in a polar coordinate system, three-dimensional data encoding devices 100 and 130 can improve coding efficiency using num_virtual_node, and in the case where encoding is performed in a Cartesian coordinate system, three-dimensional data encoding devices 100 and 130 can reduce a code amount of overhead by not adding num_virtual_node to a bitstream.

In num_virtual_node, parameters indicated in FIG. 9 may be added to a bitstream and determined as Equation 1 shown below.

$$\text{num\_virtual\_node} = \text{num\_virtual\_node\_gt0} + \text{num\_virtual\_node\_gt1} + \text{num\_virtual\_node\_minus2} \quad \text{(Equation 1)}$$

num_virtual_node_gt0 is information indicating whether num_virtual_node is greater than 0. For example, num_virtual_node_gt0 indicating 0 may indicate that num_virtual_node is 0, and num_virtual_node_gt0 indicating 1 may indicate that num_virtual_node is greater than 0. In the case where num_virtual_node_gt0 is not included in a bitstream, three-dimensional data decoding devices 120 and 150 may estimate that num_virtual_node_gt0 indicates 0.

num_virtual_node_gt1 is information indicating whether num_virtual_node is greater than 1. For example, num_virtual_node_gt1 indicating 0 may indicate that num_virtual_node is 1, and num_virtual_node_gt1 indicating 1 may indicate that num_virtual_node is greater than 1. In the case where num_virtual_node_gt1 is not included in a bitstream, three-dimensional data decoding devices 120 and 150 may estimate that num_virtual_node_gt1 indicates 0.

num_virtual_node_minus2 is information indicating a number that is 2 subtracted from a number being num_virtual_node. For example, num_virtual_node_minus2 indicating 0 may indicate that the number being num_virtual_node is 2, and num_virtual_node_minus2 indicating 1 may indicate that the number being num_virtual_node is 3. In the case where num_virtual_node_minus2 is not included in a bitstream, three-dimensional data decoding devices 120 and 150 may estimate that num_virtual_node_minus2 indicates 0.

residual_is_zero is information indicating whether residual_value is 0. For example, residual_is_zero indicating 1 indicates that residual_value is 0, and residual_is_zero indicating 0 indicates that residual_value is not 0. Note that, in the case of pred_mode=0 (e.g., no prediction, the predicted value is 0), the possibility that residual_value becomes 0 is low. Therefore, three-dimensional data encoding devices 100 and 130 need neither encode residual_is_zero nor add encoded residual_is_zero to a bitstream. In this case, in the case of pred_mode=0, three-dimensional data decoding devices 120 and 150 may estimate that residual_is_zero is 0 rather than decoding residual_is_zero from a bitstream.

residual_sign is information (a sign bit) indicating whether residual_value is positive or negative. For example, residual_sign indicating 1 indicates that a value of residual_value is negative, and residual_sign indicating 0 indicates that the value of residual_value is positive. If condition 1 ((j>0 && gps_alt_coordinates_flag)||pred_mode>0 || intra_pred_flag=0) illustrated in FIG. 9 is not satisfied, residual_value is a positive value. Therefore, three-dimensional data encoding devices 100 and 130 need neither encode residual_sign nor add encoded residual_sign to a bitstream. In the case where condition 1 is not satisfied, three-dimensional data decoding devices 120 and 150 may estimate that a value indicated by residual_sign is 0 rather than decoding residual_sign from a bitstream.

Here, j represents one element in geometry information. For example, in the case of gps_alt_coordinates_flag=1, j may indicate a polar coordinate, where j=0 indicates a radius (radius), j=1 indicates horizontal angle Φ, and j=2 indicates elevation angle θ. Note that, in the case of ((j>0 && gps_alt_coordinates_flag), that is, in the case where the coordinate system is a polar coordinate system, and where an element in geometry information is horizontal angle Φ or elevation angle θ, a residual (residual) may become negative. Thus, three-dimensional data encoding devices 100 and 130 may add residual_sign to a bitstream according to condition 1, and in the case where condition 1 is not satisfied, three-dimensional data encoding devices 100 and 130 may reduce a code amount by not adding residual_sign to the bitstream. In the case of intra_pred_flag=0, that is, in the case of the inter prediction, residuals (residual) may become negative for all elements in geometry information. Thus, three-dimensional data encoding devices 100 and 130 may add residual_sign to a bitstream according to condition 1, and in the case where condition 1 is not satisfied, three-dimensional data encoding devices 100 and 130 may reduce a code amount by not adding residual_sign to the bitstream. In the case of pred_mode=0 (e.g., no prediction, the predicted value is 0, or a prediction residual is equal to or greater than 0 because a predicted value added to a header is used, etc.), residual_value becomes a positive value. Therefore, three-dimensional data encoding devices 100 and 130 need neither encode residual_sign nor add encoded residual_sign to a bitstream, according to condition 1. In the case where residual_sign is not added to a bitstream, three-dimensional data decoding devices 120 and 150 may estimate that a value indicated by residual_sing is 0 rather than decoding residual_sing from the bitstream.

residual_bitcount_minus1 indicates a value that is obtained by subtracting 1 from a bit count of residual_bit. That is, Equation 2 shown below is established.

residual_bitcount=residual_bitcount_minus1+1     (Equation 2)

residual_bit[k] indicates k-th bit information of an absolute value of residual_value that is binarized in a fixed length in accordance with a value of residual_bitcount.

For example, three-dimensional data encoding devices 100 and 130 may entropy encode types of information that are described with reference to FIG. 9, such as pred_mode, num_virtual_node_gt0, num_virtual_node_gt1, num_virtual_node_minus2, residual_is_zero, residual_sign, residual_bitcount_minus1, and residual_bit and may add the encoded information to a header. For example, three-dimensional data encoding devices 100 and 130 may binarize and arithmetic-encode the information. Three-dimensional data encoding devices 100 and 130 may encode the information in a fixed length to keep a processing amount low. In the case where three-dimensional data encoding devices 100 and 130 binarize the types of information and arithmetic-encode each bit, three-dimensional data encoding devices 100 and 130 may switch coding tables (or contexts) to improve coding efficiency. For example, three-dimensional data encoding devices 100 and 130 may switch contexts based on a value of intra_pred_flag. Specifically, three-dimensional data encoding devices 100 and 130 may prepare a context for intra_pred_flag=1, that is, the intra prediction and a context for intra_pred_flag=0, that is, the inter prediction for each item of information and may switch the context for arithmetic-encoding each item of information based on whether a node to be encoded is encoded by the intra prediction or the inter prediction. Accordingly, it is possible to improve coding efficiency by switching optimal contexts between the intra prediction and the inter prediction for encoding.

It should be noted that the devices or processes, syntax, and so on, disclosed using FIG. 1 to FIG. 6 may be implemented by being combined with at least part of another embodiment. Furthermore, the devices or processes, syntax, and so on, disclosed using FIG. 1 to FIG. 6 may be implemented by being combined with another embodiment. Moreover, all of the structural components disclosed using FIG. 1 to FIG. 6 are not necessarily all required, and it is acceptable to have only some of the structural components included.

Figure 10:
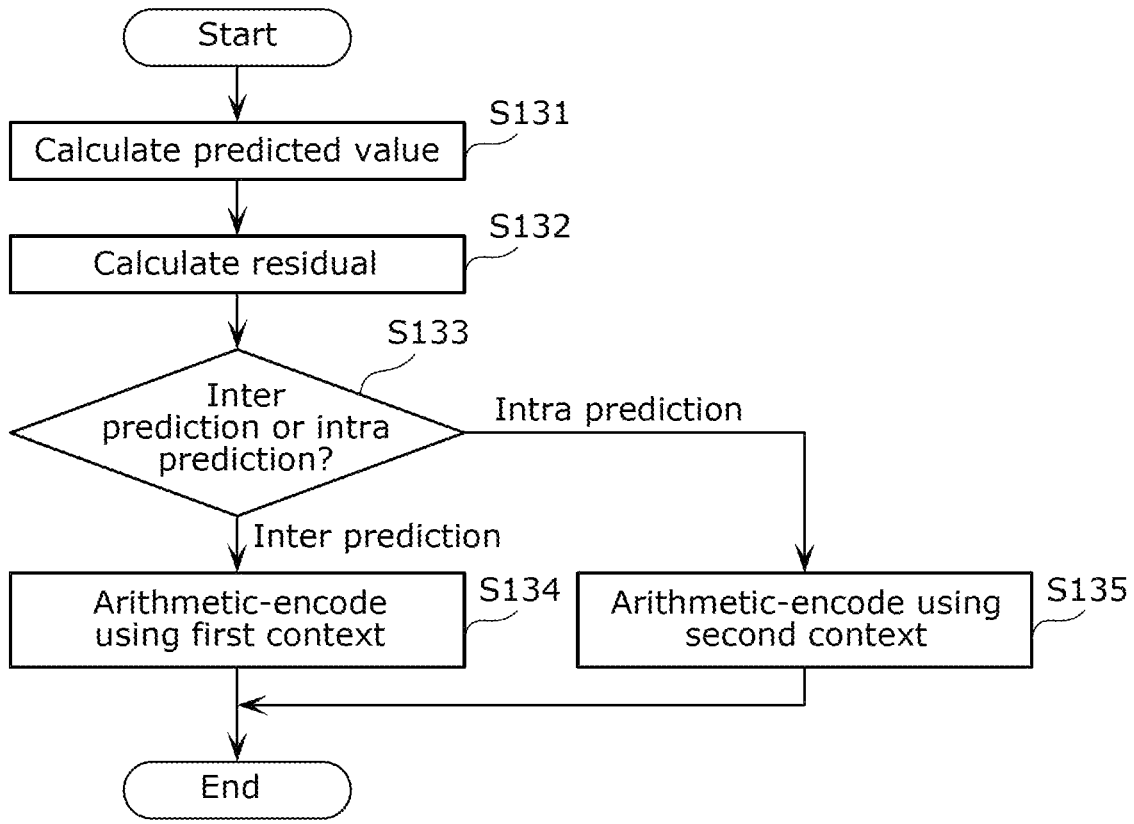
FIG. 10 is a flowchart illustrating an example of a three-dimensional data encoding process according to the embodiment.

As described above, three-dimensional data encoding devices 100 and 130 perform the process illustrated in FIG. 10. Three-dimensional data encoding devices 100 and 130 calculate a predicted value of a position of a three-dimensional point according to one of inter prediction and intra prediction (S131). Next, three-dimensional data encoding devices 100 and 130 calculate a residual between the predicted value and the position (S132). Next, three-dimensional data encoding devices 100 and 130 arithmetic-encode the residual using a first context when the predicted value is calculated according to the inter prediction (inter prediction in S133) (S134). Furthermore, three-dimensional data encoding devices 100 and 130 arithmetic-encode the residual using a second context different from the first context when the predicted value is calculated according to the intra prediction (intra prediction in S133) (S135).

Accordingly, the three-dimensional data encoding method can encode a residual using a context that is in accordance with the prediction method, and thus may be able to improve coding efficiency.

For example, the residual is expressed by first residual information (i.e., residual_is_zero) indicating whether the residual is or not.

For example, the residual is expressed by second residual information (i.e., residual_sign) indicating whether the residual is positive or negative.

For example, the residual is expressed by third residual information (i.e., residual_bitcount_minus1) about a bit count of the residual.

For example, three-dimensional data encoding devices 100 and 130 encode number information (i.e., num_virtual_node_gt0, gt1, minus2) indicating a total number of virtual points to be used in calculating the predicted value. There are cases where the number of virtual points to be used in calculating the predicted value is different depending on the prediction method. Therefore, according to this aspect, by arithmetic-encoding number information indicating the number of virtual points, in accordance with the prediction method, it may be possible to improve encoding efficiency.

For example, each of three-dimensional data encoding devices 100 and 130 includes a processor and memory, and the processor performs the above process using the memory.

Figure 11:
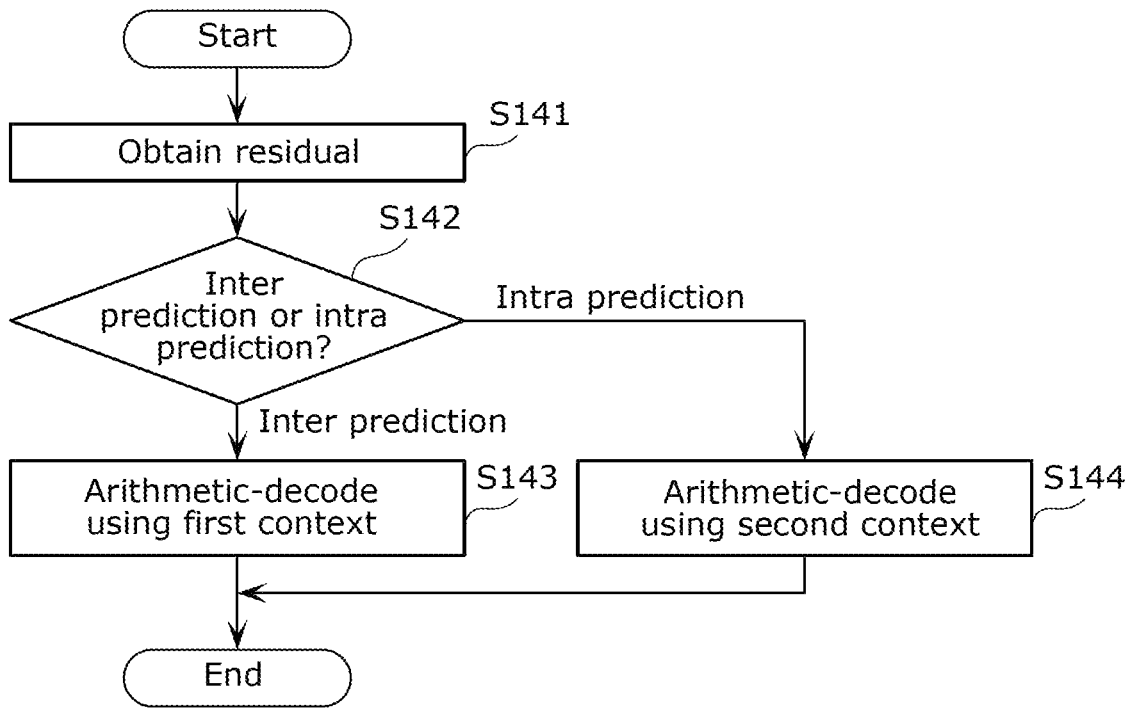
FIG. 11 is a flowchart illustrating an example of a three-dimensional data decoding process according to the embodiment.

Furthermore, the three-dimensional data decoding device according to the present embodiment performs the process illustrated in FIG. 11. The three-dimensional data decoding devices obtain a residual between a position of a three-dimensional point and a predicted value of the position, the predicted value being calculated according to one of inter prediction and intra prediction (S141). Next, three-dimensional data decoding devices 120 and 150 arithmetic-decode the residual using a first context when the predicted value is calculated according to the inter prediction (inter prediction in S142) (S143). Furthermore, three-dimensional data decoding devices 120 and 150 arithmetic-decode the residual using a second context different from the first context when the predicted value is calculated according to the intra prediction (intra prediction in S142) (S144).

Accordingly, the three-dimensional data decoding method can appropriately decode a residual using a context that is in accordance with the prediction method.

For example, the residual is expressed by first residual information (i.e., residual_is_zero) indicating whether the residual is or not.

For example, the residual is expressed by second residual information (i.e., residual_sign) indicating whether the residual is positive or negative.

For example, the residual is expressed by third residual information (i.e., residual_bitcount_minus1) about a bit count of the residual.

For example, three-dimensional data decoding devices 120 and 150 decode number information (i.e., num_virtual_node_gt0, gt1, minus2) indicating a total number of virtual points to be used in calculating the predicted value. By arithmetic-decoding number information indicating the number of virtual points in accordance with the prediction method, the number information can be appropriately decoded.

For example, each of three-dimensional data decoding devices 120 and 150 includes a processor and memory, and the processor performs the above process using the memory.

Variation

In the embodiment described above, an example is described in which contexts for arithmetic-encoding information described with reference to FIG. 9, such as pred_mode, num_virtual_node_gt0, num_virtual_node_gt1, num_virtual_node_minus2, residual_is_zero, residual_sign, residual_bitcount_minus1, and residual_bit, are switched based on whether a node to be encoded is encoded by the intra prediction or the inter prediction. However, switching the contexts need not be applied to all of the types of information described above. For example, switching the contexts for arithmetic-encoding may be applied to some of the types of information described above based on whether the prediction method is the intra prediction or the inter prediction, and a context common to the intra prediction and the inter prediction may be used for the other types of information. In other words, a context used to arithmetic-encode or arithmetic-decode a first residual between a value of a first element in geometry information and a first predicted value, which is a predicted value of a radius or a horizontal angle being the first element, may differ between the inter prediction and the intra prediction. In addition, a context used to arithmetic-encode or arithmetic-decode a second residual between a value of a second element in geometry information and a second predicted value, which is a predicted value of an elevation angle being the second element, may be the same irrespective of whether the prediction method is the inter prediction or the intra prediction.

Accordingly, for information providing a value that tends to differ between the intra prediction and the inter prediction, the contexts for arithmetic-encoding can be adaptively switched. For information providing a value that tends to be the same between the intra prediction and the inter prediction, the common context for arithmetic-encoding can be used, and coding efficiency can be improved.

Specifically, in the case where at least one of residual_is_zero, residual_sign, and redisual_bitcount_minus1, which are types of residual information relating to j=0 (radius), j=1 (horizontal angle $\Phi$), and j=2 (elevation angle $\theta$ or lidar-scanning-line information) described above is to be arithmetic-encoded, switching the contexts for arithmetic-encoding may be applied based on whether the prediction method is the intra prediction or the inter prediction for residual information relating to radius and horizontal angle t, and the context common to the intra prediction and the inter prediction may be used for residual information relating to elevation angle $\theta$ or lidar-scanning-line information. Here, the residual information relating to radius and horizontal angle $\Phi$ is an example of a first residual, and the residual information relating to elevation angle $\theta$ or the lidar-scanning-line information is an example of a second residual.

Accordingly, by encoding the same elevation angles or lidar scanning lines preferentially, coding efficiency can be improved by selecting an appropriate context in the case where radius and horizontal angle $\theta$ are encoded by the intra prediction and the inter prediction in a switching manner while elevation angle $\theta$ or the lidar-scanning-line information is encoded by the intra prediction. Note that calculation of the lidar-scanning-line information may be calculated started with a laser position at which a scanning angle has the closest value to elevation angle $\theta$.

Figure 12:
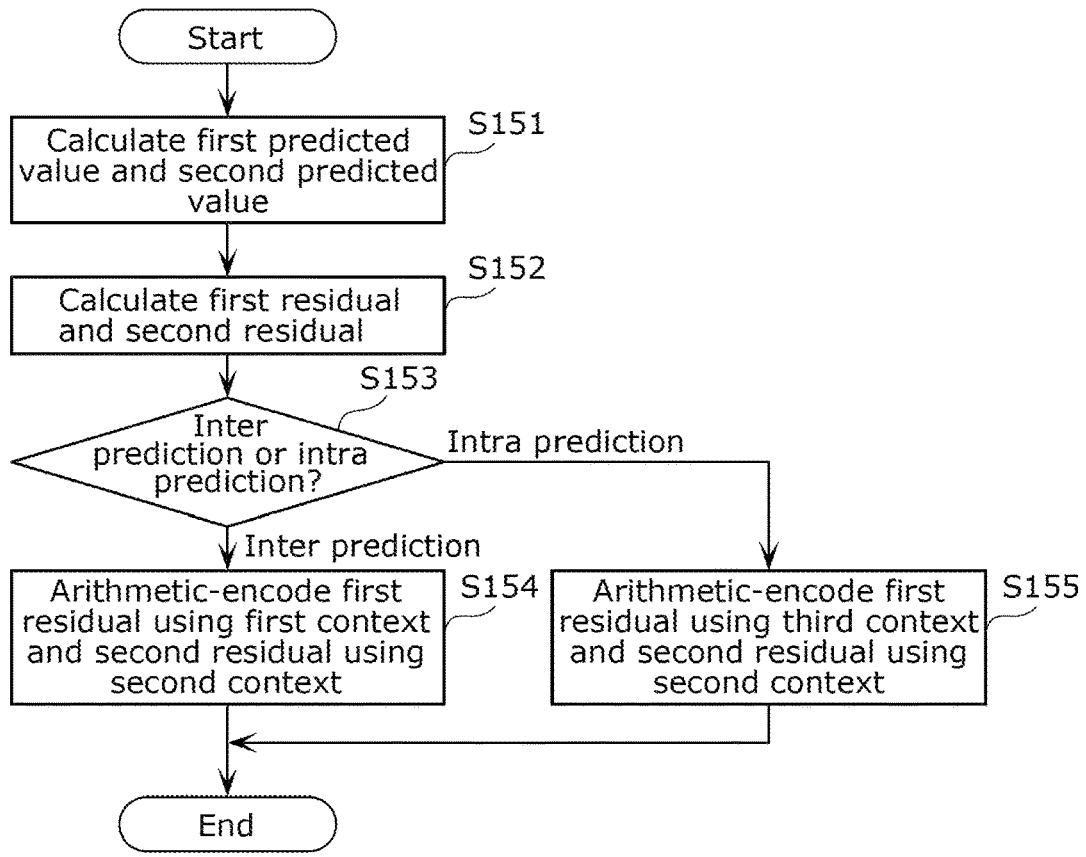
FIG. 12 is a flowchart illustrating an example of a three-dimensional data encoding process according to a variation.

Furthermore, three-dimensional data encoding devices 100 and 130 may perform the process illustrated in FIG. 12. Three-dimensional data encoding devices 100 and 130 calculate a first predicted value of a first element of a position of a three-dimensional point and a second predicted value of a second element of the position, according to one of inter prediction and intra prediction (S151). Next, three-dimensional data encoding devices 100 and 130 calculate a first residual between the first predicted value and the first element, and a second residual between the second predicted value and the second element (S152). Next, three-dimensional data encoding devices 100 and 130 arithmetic-encode the first residual using a first context and arithmetic-encode the second residual using a second context, when the first predicted value and the second predicted value are calculated according to the inter prediction (inter prediction in S153) (S154). Furthermore, three-dimensional data encoding devices 100 and 130 arithmetic-encode the first residual using a third context different from the first context and arithmetic-encoding the second residual using the second context, when the first predicted value and the second predicted value are calculated according to the intra prediction (intra prediction in S153) (S155).

Accordingly, the three-dimensional data encoding method can encode the first residual of the first element using a context that is in accordance with the prediction method, and thus, by encoding the first residual according to a prediction method suited to the first element and using a context corresponding to the first element, it may be possible to improve encoding efficiency.

For example, the first element is a radius or a horizontal angle. Furthermore, for example, the second element is an elevation angle. Since there are cases where the value that appears for the elevation angle tends to be the same between intra prediction and inter prediction, it may be possible to improve encoding efficiency by performing arithmetic encoding using a context that is common between intra prediction and inter prediction.

For example, each of three-dimensional data encoding devices 100 and 130 includes a processor and memory, and the processor performs the above process using the memory.

Figure 13:
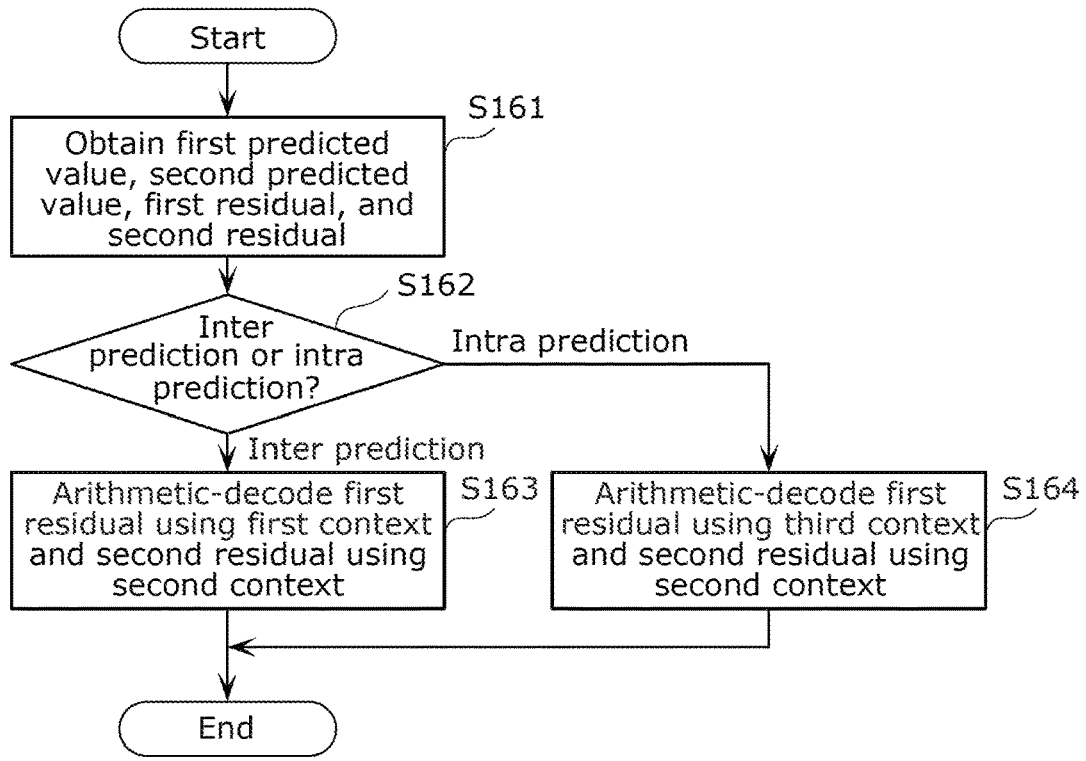
FIG. 13 is a flowchart illustrating an example of a three-dimensional data decoding process according to a variation.

Furthermore, three-dimensional data decoding devices 120 and 150 according to the variation may perform the process illustrated in FIG. 13. Three-dimensional data decoding devices 120 and 150 obtain a first predicted value of a first element of a position of a three-dimensional point, a second predicted value of a second element of the position, a first residual between the first predicted value and a value of the first element, and a second residual between the second predicted value and a value of the second element, the first predicted value and the second predicted value being calculated according to one of inter prediction and intra prediction (S161). Next, three-dimensional data decoding devices 120 and 150 arithmetic-decode the first residual using a first context and arithmetic-decoding the second residual using a second context different from the first context, when the first predicted value and the second predicted value are calculated according to the inter prediction (inter prediction in S162) (S163). Furthermore, three-dimensional data decoding devices 120 and 150 arithmetic-decode the first residual using a third context different from the first context and arithmetic-decoding the second residual using the second context, when the first predicted value and the second predicted value are calculated according to the intra prediction (intra prediction in S162) (S164).

Accordingly, the three-dimensional data decoding device can appropriately decode the first residual of the first element using a context that is in accordance with the prediction method.

For example, the first element is a radius or a horizontal angle. Furthermore, for example, the second element is an elevation angle. By performing arithmetic decoding using a context that is common to intra prediction and inter prediction, the elevation angle can be appropriately decoded.

For example, each of three-dimensional data decoding devices 120 and 150 includes a processor and memory, and the processor performs the above process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

The invention claimed is:
1. A three-dimensional data encoding method comprising:
    calculating a predicted value of a position of a three-dimensional point according to one of inter prediction and intra prediction;
    calculating a residual between the predicted value and the position;
    arithmetic-encoding the residual using a first context when the predicted value is calculated according to the inter prediction; and
    arithmetic-encoding the residual using a second context different from the first context when the predicted value is calculated according to the intra prediction, wherein
    the residual is expressed by third residual information indicating a bit count of the residual.

2. The three-dimensional data encoding method according to claim 1, wherein
the residual is expressed by first residual information indicating whether the residual is 0.

3. The three-dimensional data encoding method according to claim 1, wherein
the residual is expressed by second residual information indicating whether the residual is positive or negative.

4. The three-dimensional data encoding method according to claim 1, further comprising:
arithmetic-encoding, according to the inter prediction or the intra prediction, number information indicating a total number of virtual points to be used in calculating the predicted value.

5. A three-dimensional data encoding method comprising:
calculating a first predicted value of a first element of a position of a three-dimensional point and a second predicted value of a second element of the position, according to one of inter prediction and intra prediction;
calculating a first residual between the first predicted value and the first element, and a second residual between the second predicted value and the second element;
arithmetic-encoding the first residual using a first context and arithmetic-encoding the second residual using a second context, when the first predicted value and the second predicted value are calculated according to the inter prediction; and
arithmetic-encoding the first residual using a third context different from the first context and arithmetic-encoding the second residual using the second context, when the first predicted value and the second predicted value are calculated according to the intra prediction.

6. The three-dimensional data encoding method according to claim 5, wherein
the first element is a radius or a horizontal angle, and the second element is an elevation angle.

7. A three-dimensional data decoding method comprising:
obtaining a residual between a position of a three-dimensional point and a predicted value of the position, the predicted value being calculated according to one of inter prediction and intra prediction;
arithmetic-decoding the residual using a first context when the predicted value is calculated according to the inter prediction; and
arithmetic-decoding the residual using a second context different from the first context when the predicted value is calculated according to the intra prediction, wherein
the residual is expressed by third residual information indicating a bit count of the residual.

8. The three-dimensional data decoding method according to claim 7, wherein
the residual is expressed by first residual information indicating whether the residual is 0.

9. The three-dimensional data decoding method according to claim 7, wherein
the residual is expressed by second residual information indicating whether the residual is positive or negative.

10. The three-dimensional data decoding method according to claim 7, wherein
arithmetic-decoding, according to the inter prediction or the intra prediction, number information indicating a total number of virtual points to be used in calculating the predicted value.

11. A three-dimensional data decoding method comprising:
obtaining a first predicted value of a first element of a position of a three-dimensional point, a second predicted value of a second element of the position, a first residual between the first predicted value and a value of the first element, and a second residual between the second predicted value and a value of the second element, the first predicted value and the second predicted value being calculated according to one of inter prediction and intra prediction;
arithmetic-decoding the first residual using a first context and arithmetic-decoding the second residual using a second context different from the first context, when the first predicted value and the second predicted value are calculated according to the inter prediction; and
arithmetic-decoding the first residual using a third context different from the first context and arithmetic-decoding the second residual using the second context, when the first predicted value and the second predicted value are calculated according to the intra prediction.

12. The three-dimensional data decoding method according to claim 11, wherein
the first element is a radius or a horizontal angle, and the second element is an elevation angle.

* * * * *